(12) United States Patent
Lee et al.

(10) Patent No.: US 10,515,048 B2
(45) Date of Patent: Dec. 24, 2019

(54) ELECTRONIC DEVICE CONFIGURED TO CONTROL NON-DIRECTLY CONNECTED STORAGE DEVICE AMONG SERIALLY CONNECTED STORAGE DEVICES, STORAGE DEVICE INCLUDED THEREIN, COMPUTING SYSTEM INCLUDING THE SAME, AND OPERATION METHOD OF CONTROLLER OF STORAGE DEVICE

(71) Applicant: SAMSUNG ELECTRONICS CO., LTD., Hwaseong-si, Gyeonggi-do (KR)

(72) Inventors: Youngmin Lee, Seoul (KR); Sungho Seo, Seoul (KR); Hyuntae Park, Yongin-si (KR); Hwaseok Oh, Yongin-si (KR)

(73) Assignee: Samsung Electronics Co., Ltd., Suwon-si, Gyeonggi-do (KR)

(*) Notice: Subject to any disclaimer, the term of this patent is extended or adjusted under 35 U.S.C. 154(b) by 191 days.

(21) Appl. No.: 15/647,558

(22) Filed: Jul. 12, 2017

(65) Prior Publication Data
US 2018/0024962 A1 Jan. 25, 2018

(30) Foreign Application Priority Data
Jul. 19, 2016 (KR) .................. 10-2016-0091534

(51) Int. Cl.
*G06F 13/42* (2006.01)
*G06F 3/06* (2006.01)
(Continued)

(52) U.S. Cl.
CPC .......... *G06F 13/4286* (2013.01); *G06F 3/061* (2013.01); *G06F 3/0632* (2013.01);
(Continued)

(58) Field of Classification Search
CPC .... G06F 13/4286; G06F 3/061; G06F 3/0632; G06F 3/0655; G06F 3/0679; H04L 69/08
See application file for complete search history.

(56) References Cited

U.S. PATENT DOCUMENTS 5,778,189 A * 7/1998 Kimura ................. G06F 13/387
709/236
6,400,729 B1 * 6/2002 Shimadoi ............... H04L 69/08
370/466

(Continued)

*Primary Examiner* — Tim T Vo
*Assistant Examiner* — Phong H Dang
(74) *Attorney, Agent, or Firm* — Volentine, Whitt & Francos, PLLC

(57) ABSTRACT

A device includes a first input/output (I/O) port for communication with an external processor, a second I/O port for communication with a second device, and an interface adaptor supporting communication through the first and second I/O ports via a protocol having a plurality of layers, including an application layer, a physical layer, and a physical adaptor layer. The application layer processes information according to an application layer format and the physical adaptor layer processes information according to a physical adaptor layer format. The device receives from the external processor through the first I/O port a request in the application layer format that one or more communication conditions be set for a physical layer of the second device, converts the request from the application layer format to the physical adaptor layer format, and sends the converted request in the physical adaptor layer format to the second device through the second I/O port.

16 Claims, 28 Drawing Sheets

(51) Int. Cl.
*H04L 29/06* (2006.01)
*H04L 29/08* (2006.01)

(52) U.S. Cl.
CPC .......... *G06F 3/0655* (2013.01); *G06F 3/0679* (2013.01); *H04L 69/08* (2013.01); *H04L 69/323* (2013.01); *H04L 69/329* (2013.01)

(56) References Cited

U.S. PATENT DOCUMENTS

| | | | |
|---|---|---|---|
| 6,718,419 | B1 | 4/2004 | Delvaux |
| 7,380,152 | B2 | 5/2008 | Chung |
| 7,475,174 | B2 | 1/2009 | Chow et al. |
| 8,166,230 | B2 | 4/2012 | Choi et al. |
| 8,301,822 | B2 | 10/2012 | Pinto et al. |
| 8,437,343 | B1 * | 5/2013 | Wagh .................... G06F 13/385 370/359 |
| 8,554,863 | B2 | 10/2013 | Toyama |
| 9,240,227 | B2 | 1/2016 | Pyeon et al. |
| 2003/0128702 | A1 | 7/2003 | Satoh et al. |
| 2010/0262701 | A1 * | 10/2010 | Odakura ................ H04L 67/14 709/228 |
| 2011/0072185 | A1 * | 3/2011 | Pinto .................... G06F 3/0607 710/315 |
| 2011/0087804 | A1 * | 4/2011 | Okaue .................... G06F 1/26 710/5 |
| 2014/0119463 | A1 * | 5/2014 | Masse ................ H03K 19/1737 375/259 |
| 2014/0185620 | A1 | 7/2014 | Radke et al. |
| 2014/0289434 | A1 * | 9/2014 | Ranganathan .......... G06F 13/42 710/105 |
| 2015/0312006 | A1 * | 10/2015 | Goulahsen ............. H04L 7/0054 714/749 |
| 2015/0331474 | A1 * | 11/2015 | Seo ...................... G06F 1/3278 713/320 |
| 2015/0370750 | A1 | 12/2015 | Eilert et al. |
| 2016/0037580 | A1 | 2/2016 | Shor et al. |

* cited by examiner

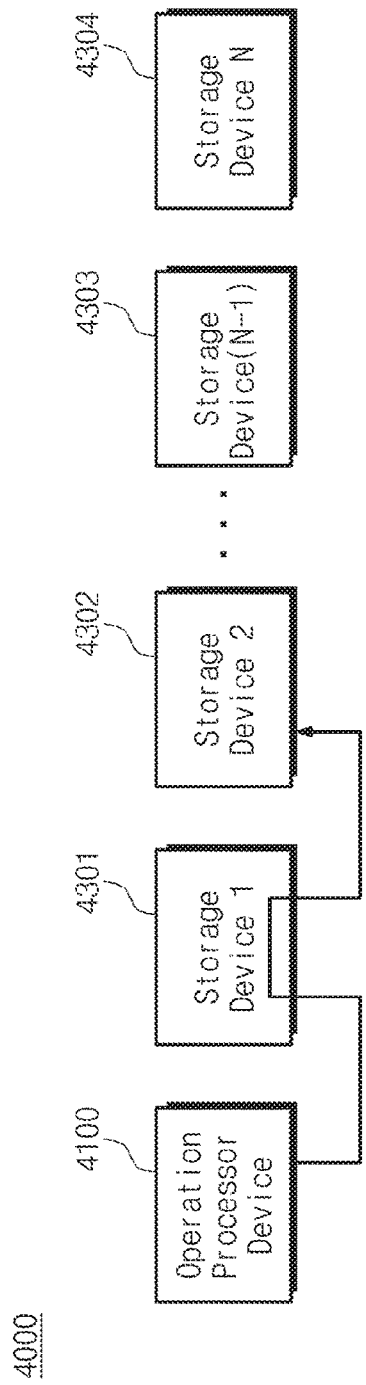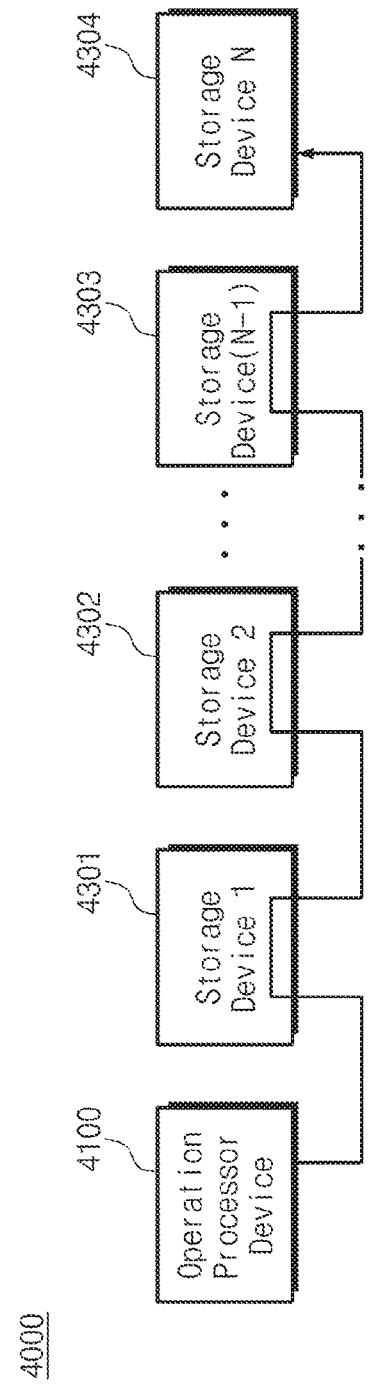

ELECTRONIC DEVICE CONFIGURED TO CONTROL NON-DIRECTLY CONNECTED STORAGE DEVICE AMONG SERIALLY CONNECTED STORAGE DEVICES, STORAGE DEVICE INCLUDED THEREIN, COMPUTING SYSTEM INCLUDING THE SAME, AND OPERATION METHOD OF CONTROLLER OF STORAGE DEVICE

FIELD OF THE INVENTION

The present disclosure relates to communication between electronic circuits or devices, and more particularly, relates to a scheme of processing one or more packets and information for interfacing between the electronic circuits or the devices.

BACKGROUND

Various kinds of electronic devices are used today. The electronic device performs its own function(s) based on operations of various electronic circuits included therein. The electronic device performs its own function(s) to provide service(s) to a user. The electronic device may operate solely to provide the service(s). Some electronic devices may communicate with other electronic device(s) or external electronic circuit(s) to provide the service(s).

An operation processor and a storage device are some examples of electronic devices. For example, the operation processor may communicate (e.g., interface) with the storage device to provide a data storage service. The operation processor may exchange data/information/signals/packets with the storage device while interfacing with the storage device. The operation processor and the storage device may employ an interface protocol to communicate with each other.

As the demand for an electronic device having higher performance and efficiency increases, a configuration and an interface manner of the electronic device have been variously evolved. For example, various circuit configurations and operation methods have been developed to implement a storage device having a larger capacity. In some cases, however, changing a circuit configuration and an operation method to satisfy a user's demand may cause an increase in cost, configuration complexity, and circuit area.

SUMMARY

The example embodiments of the present disclosure may provide electronic devices (e.g., storage devices) capable of satisfying a user's demand with relatively low complexity.

According to an aspect of the inventive concept, a device comprises: a first input/output port configured to be connected to an external processor for communication between the external processor and the device; a second input/output port configured to be connected to a second device for communication between the processor and the second device via the device; and at least one interface adaptor for supporting communication by the device through the first and second input/output ports via a protocol having a plurality of layers including at least an application layer, a physical layer, and a physical adaptor layer, wherein the application layer processes information according to an application layer format and the physical adaptor layer processes information according to a physical adaptor layer format, wherein the device is configured to receive from the external processor through the first input/output port a request in the application layer format that one or more communication conditions be set for a physical layer of the second device, to convert the received request from the application layer format to the physical adaptor layer format, and to send the converted request in the physical adaptor layer format to the second device through the second input/output port.

According to another aspect of the inventive concept, a device comprises: a first input/output port configured to be connected to an external processor for communication between the external processor and the device; a second input/output port configured to be connected to a second device for communication between the processor and the second device via the device; and at least one interface adaptor for supporting communication by the device through the first and second input/output ports via a protocol having a plurality of layers including at least an application layer, and a physical layer and physical adaptor layer for each of the first and second input/output ports, wherein the application layer processes information according to an application layer format and the physical adaptor layer processes information according to a physical adaptor layer format, wherein the device is configured: to receive from the external processor through the first input/output port a request in the physical adaptor layer format that one or more communication conditions be set for the physical layer of the device or a physical layer of the second device; to determine from the received request in the physical adaptor layer format whether the request pertains to the device; and to forward the request in the physical adaptor layer format to the second device through the second input/output port when it is determined the received request does not pertain to the device.

According to yet another aspect of the inventive concept, a storage system includes: a processor having a processor input/output port; and a first storage device having a first input/output port connected to the processor input/output port for communication between the processor and the first storage device, and having a second input/output port, the first storage device further comprising a first nonvolatile memory for storing data associated with the processor, and at least one first interface adaptor for supporting communication by the first storage device through the first and second input/output ports via a protocol having a plurality of layers including at least a physical layer for each of the input/output ports, wherein the first storage device is configured such that when the processor detects that a second storage device is connected to the second input/output port of the first storage device, and the processor sends to the first storage device through the first input/output port a request that a communication condition be set for a physical layer of the second storage device, then in response to receiving the request the first storage device provides the request to the second storage device through the second input/output port in a format which can be processed by a layer of the second storage device which manages communication conditions of the physical layer of the second storage device.

According to still another aspect of the inventive concept, a device comprises: a first input/output port configured to be connected to an external processor for communication between the external processor and the device; a second input/output port configured to be connected to a second device for communication between the processor and the second device via the device; and at least one interface adaptor for supporting communication by the device through the first and second input/output ports via a protocol having a plurality of layers including at least a physical layer for each of the input/output ports, wherein the device is configured to receive from the external processor via the first input/output port a request that a communication condition be set for a physical layer of the second device, and in response to receiving the request to provide the request to the second device via the second input/output port in a format which can be processed by a layer of the second device which manages communication conditions of the physical layer of the second device.

According to a further aspect of the inventive concept, for a device having a first input/output port configured to be connected to an external processor for communication between the external processor and the device, a second input/output port configured to be connected to a second device for communication between the processor and the second device via the device, and at least one interface adaptor for supporting communication by the device through the first and second input/output ports via a protocol having a plurality of layers including at least a physical layer for each of the input/output ports, a method is provided comprising: the device receiving from the external processor through the first input/output port a request that a communication condition be set for a physical layer of the second device; and in response to receiving the request, providing the request to the second device through the second input/output port in a format which can be processed by a layer of the second device which manages communication conditions of the physical layer of the second device.

According to yet a further aspect of the inventive concept, for a device having a first input/output port configured to be connected to an external processor for communication between the external processor and the device, a second input/output port configured to be connected to a second device for communication between the processor and the second device via the device, and at least one interface adaptor for supporting communication by the device through the first and second input/output ports, the at least one interface adaptor supporting a protocol having a plurality of layers including at least a physical layer for each of the input/output ports, a method is provided comprising: the device receiving from the external processor through the first input/output port a request that a communication condition be set for the physical layer of the device or a physical layer of the second device; the device determining whether the request pertains to the device or the second device; and when the request pertains to the second device, providing the request to the second device through the second input/output port in a format which can be processed by a layer of the second device which manages communication conditions of the physical layer of the second device.

According to still a further aspect of the inventive concept, for a device having a first input/output port configured to be connected to an external processor for communication between the external processor and the device, a second input/output port configured to be connected to a second device for communication between the processor and the second device via the device, and at least one interface adaptor for supporting communication by the device through the first and second input/output ports via a protocol having a plurality of layers including at least an application layer, a physical layer, and a physical adaptor layer, wherein the application layer processes information according to an application layer format and the physical adaptor layer processes information according to a physical adaptor layer format, a method is provided comprising: the device receiving from the external processor through the first input/output port a request in the application layer format that a communication condition be set for a physical layer of the second device; the device converting the request from the application layer format to the physical adaptor layer format; and the device sending the request in the physical adaptor layer format to the second device through the second/input output port.

According to still a further aspect of the inventive concept, for a device having a first input/output port configured to be connected to an external processor for communication between the external processor and the device, a second input/output port configured to be connected to a second device for communication between the processor and the second device via the device, and at least one interface adaptor for supporting communication by the device through the first and second input/output ports via a protocol having a plurality of layers including at least an application layer, a physical layer, and a physical adaptor layer, wherein the application layer processes information according to an application layer format and the physical adaptor layer processes information according to a physical adaptor layer format, a method is provided comprising: the device receiving from the external processor through the first input/output port a request in the physical adaptor layer format that a communication condition be set for the physical layer of the device or a physical layer of the second device; the device determining from the request in the physical adaptor layer format whether the request pertains to the device; and when the request does not pertain to the device, the device providing the request in the physical adaptor layer format to the second device through the second/input output port.

BRIEF DESCRIPTION OF THE DRAWINGS

The above and other objects and features will become apparent from the following description with reference to the following figures, wherein like reference numerals refer to like parts throughout the various figures unless otherwise specified.

FIGS. 22A and 22B are conceptual diagrams for describing a process of controlling a storage device that is not directly connected the operation processor device in the storage system of FIG. 21.

DETAILED DESCRIPTION OF EMBODIMENTS

Below, the example embodiments of the present disclosure will now be more fully described with reference to accompanying drawings so that those skilled in the art can readily comprehend the inventive concepts.

Figure 1:
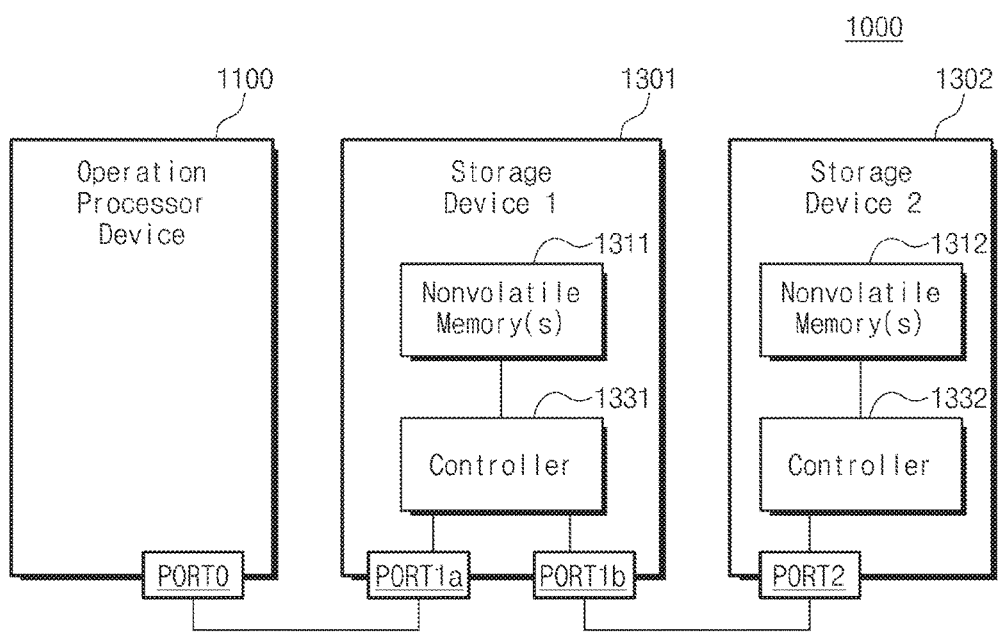
FIG. 1 is a block diagram illustrating a storage system that includes serially connected storage devices, according to some example embodiments.

FIG. 1 is a block diagram illustrating a storage system 1000 that includes serially connected storage devices, according to some example embodiments. Storage system 1000 may include an operation processor device 1100, a first storage device 1301, and a second storage device 1302.

Operation processor device 1100 may manage and process overall operations of storage system 1000. Operation processor device 1100 may perform various arithmetic operations/logical operations. For example, operation processor device 1100 may include one or more processor cores. Operation processor device 1100 may be implemented to include a special-purpose circuit (e.g., field programmable gate arrays (FPGA), application specific integrated circuits (ASICs), and/or the like), or may be implemented in a system on chip (SoC). For example, operation processor device 1100 may include a general-purpose processor, a special-purpose processor, or an application processor. Operation processor device 1100 may be a processor itself, or may be an electronic device or system including a processor. Operation processor device 1100 includes an input/output port PORT0.

First storage device 1301 may include one or more nonvolatile memories 1311 and a controller 1331, and first and second input/output ports PORT1a and PORT1b. Second storage device 1302 may include one or more nonvolatile memories 1312 and a controller 1332, and an input/output port PORT2.

Nonvolatile memories 1311 and 1312 may include memory areas for storing data. For example, when nonvolatile memories 1311 and 1312 include NAND-type flash memories, nonvolatile memories 1311 and 1312 may include memory cell arrays that are formed along a plurality of word lines and a plurality of bit lines.

However, the above example is not intended to limit the present disclosure. For example, nonvolatile memories 1311 and 1312 may include one or more of various nonvolatile memories such as a phase-change random access memory (PRAM), a magneto-resistive RAM (MRAM), a resistive RAM (ReRAM), a ferro-electric RAM (FRAM), and/or the like. To facilitate better understanding, it will be assumed in the following descriptions that nonvolatile memories 1311 and 1312 include NAND-type flash memories, but configurations of nonvolatile memories 1311 and 1312 may be variously changed or modified.

Controllers 1331 and 1332 may control overall operations of storage devices 1301 and 1302 respectively. To this end, each of controllers 1331 and 1332 may include one or more processor cores and a buffer memory. For example, controllers 1331 and 1332 may control nonvolatile memories 1311 and 1312 respectively. Under control of controllers 1331 and 1332, data may be stored in nonvolatile memories 1311 and 1312 and/or data stored in nonvolatile memories 1311 and 1312 may be output.

Operation processor device 1100 may provide one or more commands and/or query(ies) to first and second storage devices 1301 and 1302. Operation processor device 1100 may exchange data with first and second storage devices 1301 and 1302. In some example embodiments, commands, queries, and data may be transferred in a unit of packet. However, the present disclosure is not limited thereto.

For example, when operation processor device 1100 provides a write command and write data to one of the first and second storage devices 1301 and 1302, the corresponding one of the first and second storage devices 1301 and 1302 may store the write data in the corresponding one of the nonvolatile memories 1311 and 1312. For example, when operation processor device 1100 provides a read command to one of the first and second storage devices 1301 and 1302, the corresponding one of the first and second storage devices 1301 and 1302 may output read data stored in the corresponding one of the nonvolatile memories 1311 and 1312.

Operation processor device 1100 may be a host device that is provided with a storage service from first and second storage devices 1301 and 1302. A user of storage system 1000 may be provided with the storage service as operation processor device 1100 operates.

In the example embodiments, operation processor device 1100 may be serially connected with first and second storage devices 1301 and 1302. Referring to FIG. 1, operation processor device 1100 may be connected to directly communicate with first storage device 1301 through input/output ports PORT0 and PORT1a. In addition, first storage device 1301 may be connected to directly communicate with second storage device 1302 through input/output ports PORT1b and PORT2. However, operation processor device 1100 may not be directly connected with second storage device 1302. For example, such connections between operation processor device 1100 and first and second storage devices 1301 and 1302 may be understood as the topology of a "chain" structure or a "daisy-chain" structure.

For example, controller 1331 may be configured to directly communicate with operation processor device 1100, to exchange read data and write data with operation processor device 1100. For example, controllers 1331 and 1332 may be configured to directly communicate with each other, to exchange read data and write data with each other. On the other hand, controller 1332 may not be directly connected with operation processor device 1100.

Unlike a configuration illustrated in FIG. 1, in some cases, operation processor device 1100 may be directly connected with both of storage devices 1301 and 1302. For example, first and second storage devices 1301 and 1302 may be connected in parallel to operation processor device 1100. However, in such cases, operation processor device 1100 may include multiple input/output ports that are connected with first and second storage devices 1301 and 1302—for example a first input/output port which is connected with first storage device 1301 and a second input/output port which is connected with second storage device 1302. In addition, operation processor device 1100 may include communication circuits to communicate with both of first and second storage devices 1301 and 1302 and peripheral circuits that drive/control the communication circuits—for example a first communication circuit and a first peripheral circuit for communicating with first storage device 1301 and a second communication circuit and a second peripheral circuit for communicating with second storage device 1302.

On the other hand, according to the example embodiment illustrated in FIG. 1, operation processor device 1100 may not directly communicate with second storage device 1302. Accordingly, operation processor device 1100 may only include the input/output port PORT0 connected with first storage device 1301, a communication circuit to communicate with first storage device 1301, and a peripheral circuit that drives/controls the communication circuit. Instead, first storage device 1301 may include the input/output port PORT1*b* connected with second storage device 1302, a communication circuit to communicate with second storage device 1302, and a peripheral circuit that drives/controls the communication circuit.

Thus, according to the example embodiment illustrated in FIG. 1, a configuration of operation processor device 1100 may be simplified, and an area occupied by operation processor device 1100 may decrease. Moreover, design/manufacturing costs of operation processor device 1100 may decrease. In addition to such economical benefits, employing two storage devices 1301 and 1302 may provide a larger storage capacity in comparison to employing only one storage device. Accordingly, a user's demand may be satisfied.

In such the example embodiment, a configuration of the first storage device may become complicated somewhat. However, in most cases, operation processor device 1100 may operate at a speed of several or dozens gigahertz (GHz), and first storage device 1301 may operate at a speed of several to dozens megahertz (MHz). In addition, a process of manufacturing operation processor device 1100 may be more difficult and complex than a process of manufacturing first storage device 1301. Accordingly, it may be simpler and more economical to implement the input/output port PORT1*b*, the communication circuit, and the peripheral circuit in first storage device 1301.

Operation processor device 1100 and first and second storage devices 1301 and 1302 may communicate with each other in compliance with one or more of various interface protocols. For example, operation processor device 1100 and first and second storage devices 1301 and 1302 may employ at least one of a variety of serial interface protocols, such as universal serial bus (USB), small computer system interface (SCSI), peripheral component interconnect express (PCIe), nonvolatile memory express (NVMe), serial advanced technology attachment (SATA), serial attached SCSI (SAS), secure digital (SD) card, embedded multimedia card (eMMC), universal flash storage (UFS), and/or the like, so as to communicate with each other. However, this example is not intended to limit the present disclosure.

FIGS. 2A, 2B, 2C and 2D are conceptual diagrams illustrating example implementations of storage system 1000 of FIG. 1.

Figure 2A:
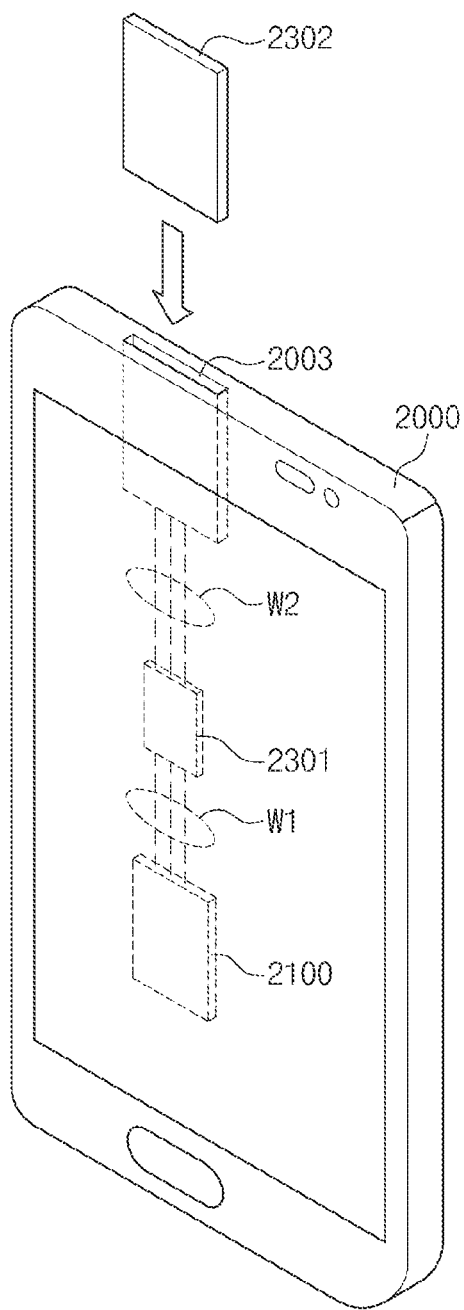
FIGS. 2A, 2B, 2C and 2D are conceptual diagrams illustrating example implementations of the storage system of FIG. 1.

Referring to FIG. 2A, storage device 1000 of FIG. 1 may be implemented in an electronic device 2000 (e.g., a smart phone, a tablet computer, or the like). Electronic device 2000 may include an application processor 2100 and an embedded storage device 2301. Electronic device 2000 may include a slot 2003 to support a removable storage device 2302. For example, removable storage device 2302 may be implemented in the form of a card, a stick, or a chip package, and may be provided in or detached from slot 2003.

For example, application processor 2100 may be connected to directly communicate with embedded storage device 2301 through a conductive pattern W1. When removable storage device 2302 is provided in slot 2003, embedded storage device 2301 may be connected to directly communicate with removable storage device 2302 through a conductive pattern W2. On the other hand, removable storage device 2302 may not be directly connected with application processor 2100.

Figure 2B:
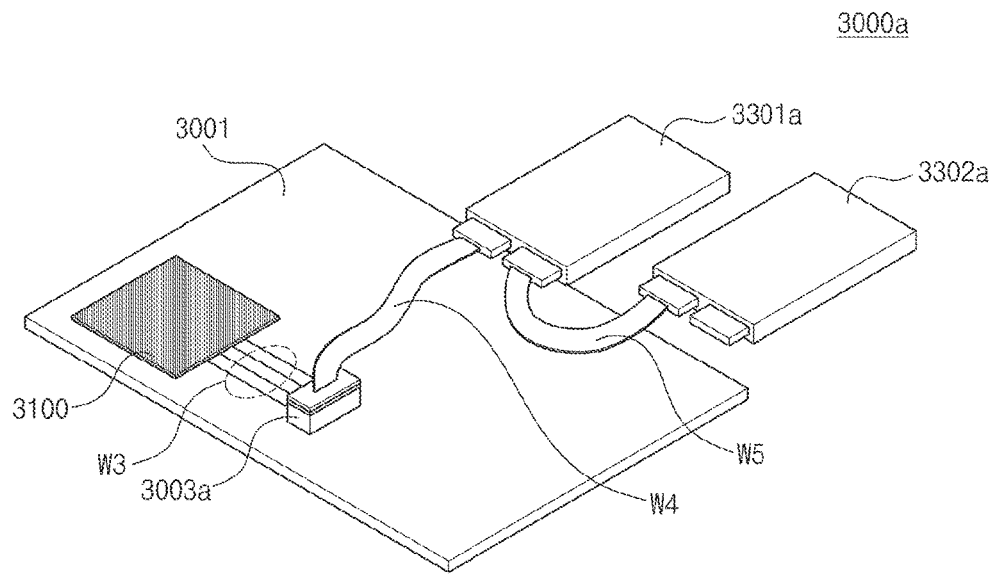
Figure 2C:
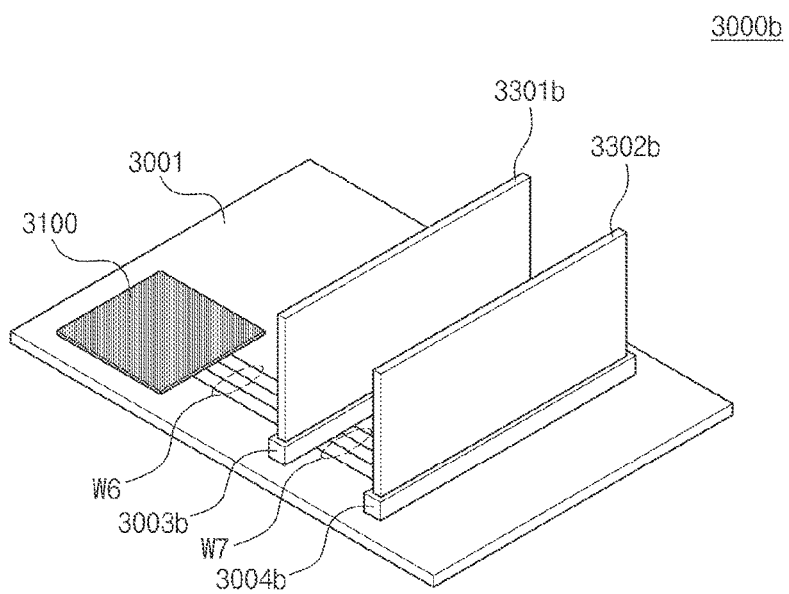
Figure 2D:
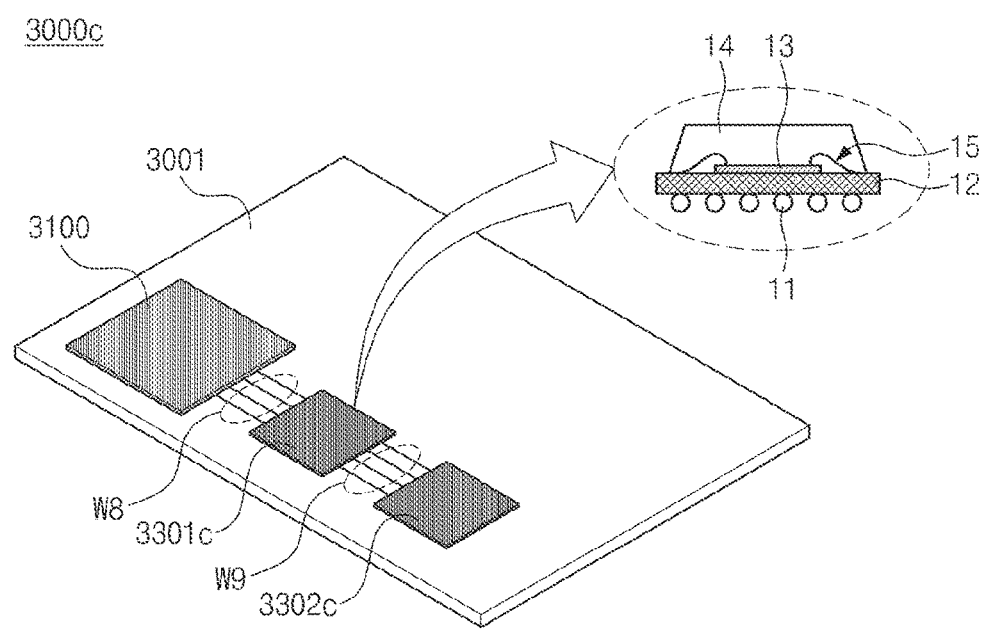

Referring to FIGS. 2B, 2C and 2D, storage system 1000 of FIG. 1 may be implemented in a computing system 3000*a*, 3000*b*, or 3000*c* (e.g., a desktop computer, a laptop computer, a workstation, a server system, or the like).

Computing system 3000*a* of FIG. 2B may include a central processing unit (CPU) 3100 and first and second storage devices 3301*a* and 3302*a*. The CPU 3100 may be equipped on a main board (or a mother board) 3001. For example, each of first and second storage devices 3301*a* and 3302*a* may be a hard disk drive (HDD) or solid state drive (SSD) that is implemented in a box module. First storage device 3301*a* may be connected with a connector 3003*a* on main board 3001, and may be connected to directly communicate with CPU 3100 through a conductive pattern W3 and a wire cable W4. Second storage device 3302*a* may be connected to directly communicate with first storage device 3301*a* through a wire cable W5. On the other hand, second storage device 3302*a* may not be directly connected with CPU 3100.

Computing system 3000*b* of FIG. 2C may include CPU 3100 and first and second storage devices 3301*b* and 3302*b*. For example, each of first and second storage devices 3301*b* and 3302*b* may be a memory module or a SSD that is implemented in a card module. First storage device 3301*b* may be connected with a connector 3003*b* on main board 3001, and may be connected to directly communicate with CPU 3100 through a conductive pattern W6. Second storage device 3302*b* may be connected with a connector 3004*b* on main board 3001, and may be connected to directly communicate with first storage device 3301*b* through a conductive pattern W7. On the other hand, second storage device 3302*b* may not be directly connected with CPU 3100.

Computing system 3000*c* of FIG. 2D may include CPU 3100 and first and second storage devices 3301*c* and 3302*c*.

For example, each of first and second storage devices 3301c and 3302c may be an on-board SSD or a ball grid array (BGA) SSD that is implemented in a chip or a chip package. First storage device 3301c may be connected to directly communicate with CPU 3100 through a conductive pattern W8, and may be connected to directly communicate with second storage device 3302c through a conductive pattern W9. On the other hand, second storage device 3302c may not be directly connected with CPU 3100.

For example, when first storage device 3301c is a BGA SSD, first storage device 3301c may include a nonvolatile memory/controller chip 13 that is mounted on a substrate 12. Nonvolatile memory/controller chip 13 may be connected with the conductive patterns W8 and W9 through a bonding 15, and may be covered with a mold compound 14. First storage device 3301c may be provided on main board 3001 through solder balls 11.

In some example embodiments, each of computing systems 3000a, 3000b, and 3000c may further include a working memory that temporarily stores data processed or to be processed by CPU 3100, a communication circuit to communicate with an external device/system, and a user interface to exchange data/information with a user. The working memory, the communication circuit, and the user interface may be equipped or mounted on main board 3001, and may be connected with CPU 3100 through conductive patterns or buses.

In FIGS. 2A, 2B, 2C and 2D, each of application processor 2100 and CPU 3100 may correspond to operation processor device 1100 of FIG. 1. Each of embedded storage device 2301 and first storage devices 3301a, 3301b, and 3301c may correspond to first storage device 1301 of FIG. 1. Each of removable storage device 2302 and second storage devices 3302a, 3302b, and 3302c may correspond to second storage device 1302 of FIGS. 2A to 2D. As described with reference to FIG. 1, the configurations of FIGS. 2A to 2D may satisfy a user's demand, and may also bring economical benefits.

For example, each of the conductive patterns W1, W2, W3, W6, W7, W8, and W9 may be a conductive material formed on a printed circuit board (PCB) or the main board 3001. For example, each of the conductive patterns W1, W2, W3, W6, W7, W8, and W9 may include a wire pattern, a trace pattern, and/or the like. For example, the conductive material may be implemented with a wire, a trace, a conductive plate, and/or the like. However, these examples are not intended to limit the present disclosure.

Figure 3:
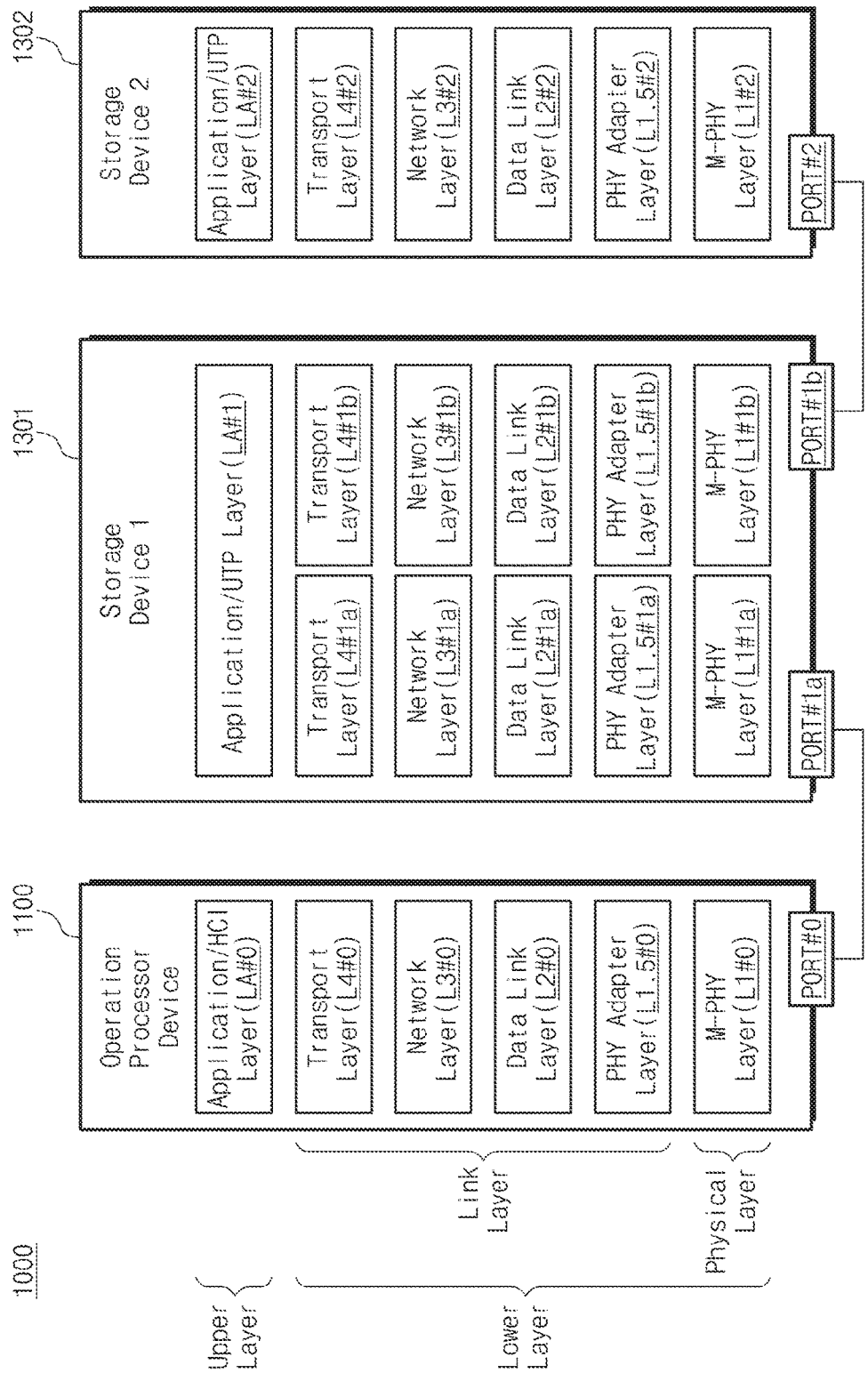
FIG. 3 is a block diagram illustrating a hierarchical structure in compliance with an example interface protocol that may be employed in the storage system of FIG. 1.

FIG. 3 is a block diagram illustrating a hierarchical structure in compliance with one or more example communication or interface protocols that may be employed in storage system 1000 of FIG. 1. For example, operation processor device 1100 and first and second storage devices 1301 and 1302 may be implemented in compliance with the UFS protocol that is supported by the mobile industry processor interface (MIPI) alliance, to communicate with each other.

In an example of FIG. 3, a communication or interface protocol (e.g., the UFS protocol) which is employed by operation processor device 1100 may include a M-PHY layer L1#0, a PHY adapter layer L1.5#0, a data link layer L2#0, a network layer L3#0, a transport layer L4#0, and an application/HCI (Host Controller Interface) layer LA#0 (hereinafter referred to as an "application layer"). Each of the layers L1#0, L1.5#0, L2#0, L3#0, L4#0, and LA#0 of operation processor device 1100 may be implemented by a physical hardware circuit and/or a program code that is executable by a processor core, to perform one's own function(s).

Similarly, first storage device 1301 may implement the communication or interface protocol having M-PHY layers L1#1a and L1#1b, PHY adapter layers L1.5#1a and L1.5#1b, data link layers L2#1a and L2#1b, network layers L3#1a and L3#1b, transport layers L4#1a and L4#b, and an application/UTP (UFS Transport Protocol) layer LA#1 (hereinafter referred to as an "application layer"). The layers L1#1a, L1#1b, L1.5#1a, L1.5#1b, L2#1a, L2#1b, L3#1a, L3#1b, L4#1a, L4#b, and LA#1 of first storage device 1301 may be implemented at least in part in controller 1331 of FIG. 1. Each of the layers L1#1a, L1#1b, L1.5#1a, L1.5#1b, L2#1a, L2#1b, L3#1a, L3#1b, L4#1a, L4#b, and LA#1 of first storage device 1301 may be implemented at least in part by a hardware circuit and/or a program code that is executable by a processor core, to perform one's own function(s).

Second storage device 1302 may implement the communication or interface protocol having a M-PHY layer L1#2, a PHY adapter layer L1.5#2, a data link layer L2#2, a network layer L3#2, a transport layer L4#2, and an application/UTP layer LA#2 (hereinafter referred to as an "application layer"). The layers L1#2, L1.5#2, L2#2, L3#2, L4#2, and LA#2 of the second storage device 1302 may be implemented in controller 1332 of FIG. 1. Each of the layers L1#2, L1.5#2, L2#2, L3#2, L4#2, and LA#2 of second storage device 1302 may be implemented by a hardware circuit and/or a program code that is executable by a processor core, to perform one's own function(s).

Each of the M-PHY layers L1#0, L1#1a, L1#1b, and L1#2 may be implemented by a communication circuit (e.g., a transmitter/receiver, a modulator/demodulator, an encoder/decoder, an oscillator, and/or the like) to transmit and receive a packet. The M-PHY layer L1#0 of operation processor device 1100 may exchange a packet with the M-PHY layer L1#1a of first storage device 1301 through the input/output ports PORT#0 and PORT#1a, and the M-PHY layer L1#1b of first storage device 1301 may exchange a packet with the M-PHY layer L1#2 of second storage device 1302 through the input/output ports PORT#1b and PORT#2. For example, each of the M-PHY layers L1#0, L1#1a, L1#1b, and L1#2 may be implemented in compliance with a M-PHY protocol supported by the MIPI alliance, as a physical layer.

The PHY adapter layers L1.5#0, L1.5#1a, L1.5#1b, and L1.5#2 may manage communication conditions of the M-PHY layers L1#0, L1#1a, L1#1b, and L1#2 respectively. For example, the PHY adapter layers L1.5#0, L1.5#1a, L1.5#1b, and L1.5#2 may process data symbols or may control power for the M-PHY layers L1#0, L1#1a, L1#1b, and L1#2 respectively. Each of the data link layers L2#0, L2#1a, L2#1b, and L2#2 may manage physical transmission and composition of data. Each of the network layers L3#0, L3#1a, L3#1b, and L3#2 may manage a communication path or may handle communication timing. Each of the transport layers L4#0, L4#1a, L4#1b, and L4#2 may detect an error of data and may recover the erroneous data.

Accordingly, the PHY adapter layers L1.5#0, L1.5#1a, L1.5#1b, and L1.5#2, the data link layers L2#0, L2#1a, L2#1b, and L2#2, the network layers L3#0, L3#1a, L3#1b, and L3#2, and the transport layers L4#0, L4#1a, L4#1b, and L4#2 may transfer and convert a packet that is transmitted/received through the M-PHY layers L1#0, L1#1a, L1#1b, and L1#2. For example, the PHY adapter layers L1.5#0, L1.5#1a, L1.5#1b, and L1.5#2, the data link layers L2#0, L2#1a, L2#1b, and L2#2, the network layers L3#0, L3#1a, L3#1b, and L3#2, and the transport layers L4#0, L4#1a, L4#1b, and L4#2 may be implemented in compliance with an UniPro protocol supported by the MIPI alliance, as a link layer.

The application layers LA#0, LA#1, and LA#2 may provide a communication service on operation processor device 1100 and storage devices 1301 and 1302, based on packets transferred through the link layer. The application layers LA#0, LA#1, and LA#2 may handle a request from a user of operation processor device 1100 and storage devices 1301 and 1302, as an upper layer. Meanwhile, the M-PHY layers L1#0, L1#1a, L1#1b, and L1#2, the PHY adapter layers L1.5#0, L1.5#1a, L1.5#1b, and L1.5#2, the data link layers L2#0, L2#1a, L2#1b, and L2#2, the network layers L3#0, L3#1a, L3#1b, and L3#2, and the transport layers L4#0, L4#1a, L4#1b, and L4#2 may communicate with an external device for the application layers LA#0, LA#1, and LA#2, as a lower layer.

Communications between each of layers may be based on packets having different data formats. For example, a data format of a packet exchanged between the application layers LA#0 and LA#1 may be different from a data format of a packet exchanged between the PHY adapter layers L1.5#0 and L1.5#1a. For example, a data format of a packet exchanged between the data link layers L2#1b and L2#2 may be different from a data format of a packet exchanged between the transport layers L4#1b and L4#2.

For example, according to the interface protocol supported by the MIPI alliance, each of the application layers LA#0, LA#1, and LA#2 may communicate and process a packet having a UFS protocol information unit (UPIU) format. For example, each of the PHY adapter layers L1.5#0, L1.5#1a, L1.5#1b, and L1.5#2 may communicate and process a packet having a data format that includes a PHY adapter control protocol (PACP) frame. Configurations of the UPIU format and the PACP frame may be readily understood by those skilled in the art, and thus detailed descriptions thereof will be omitted below.

In the example embodiments that will be described below, it will be assumed that storage system 1000 employs an UFS protocol. However, this assumption is provided to provide a concrete example to facilitate better understanding, and is not intended to limit the present disclosure. Those skilled in the art may apply the example embodiments of the present disclosure to other interface protocol(s) other than the UFS protocol, based on the following descriptions.

Figure 4:
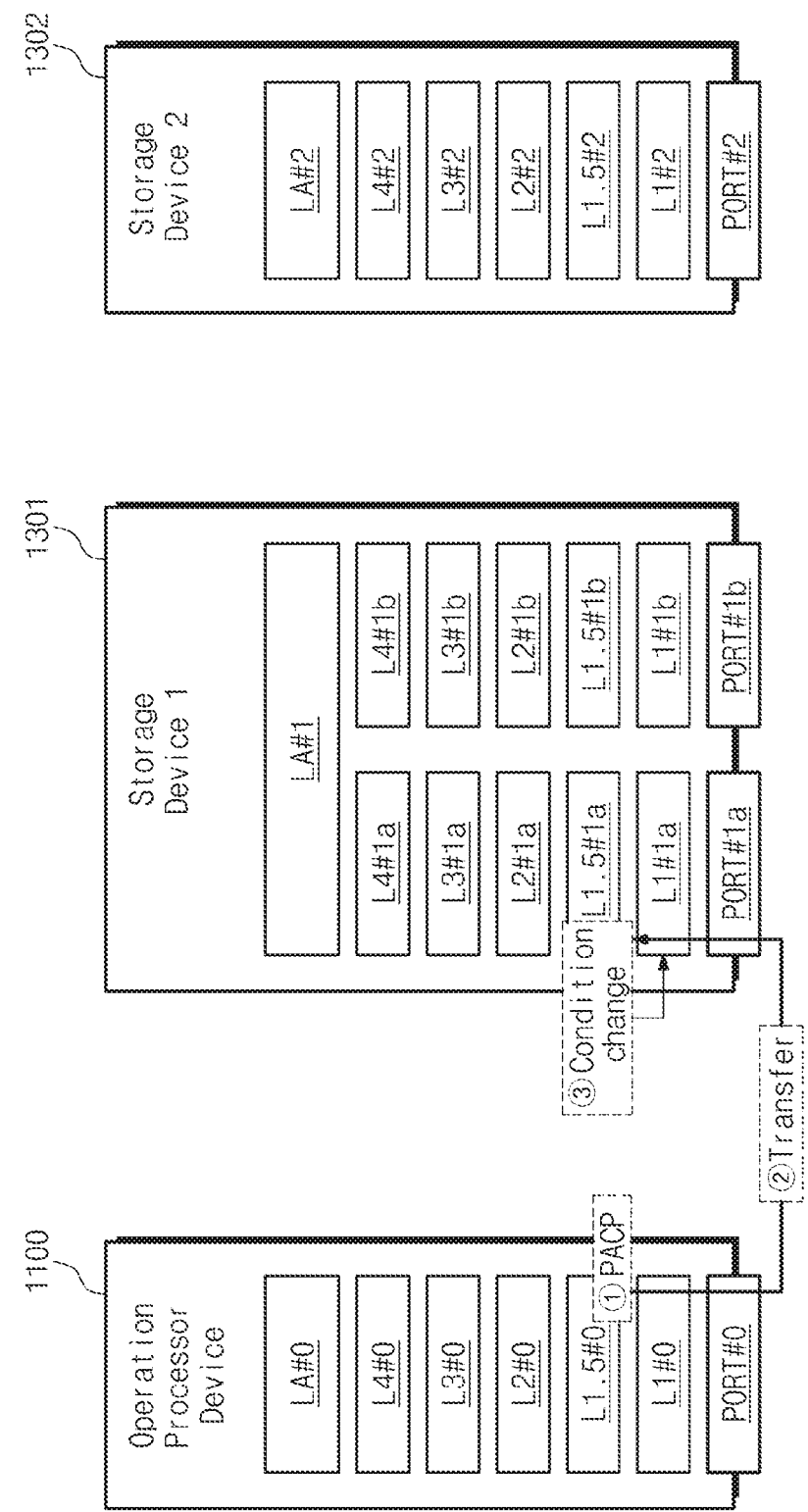
FIG. 4 is a conceptual diagram for describing a process of controlling a storage device that is directly connected to an operation processor device in the storage system of FIG. 1.

FIG. 4 is a conceptual diagram for describing a process of controlling a storage device that is directly connected to operation processor device 1100 in storage system 1000 of FIG. 1. For example, operation processor device 1100 may intend to control first storage device 1301 (e.g., a communication condition of first storage device 1301) that is connected to directly communicate with operation processor device 1100.

For example, operation processor device 1100 may intend to set or change a communication condition between the M-PHY layers L1#0 and L1#1a. For example, setting or changing the communication condition may include link startup between the M-PHY layers L1#0 and L1#1a, hibernate state enter or exit of the M-PHY layer L1#1a, power mode change of the M-PHY layer L1#1a, attribute get of the M-PHY layer L1#1a, capability change of the M-PHY layer L1#1a (e.g., changing communication speed or a gear level, changing the number of activated lanes, and/or the like), and/or the like.

Setting or changing the communication condition in first storage device 1301 may be performed between the M-PHY layer L1#1a and the PHY adapter layer L1.5#1a. The PHY adapter layer L1.5#1a may communicate and process a packet having a data format that includes a PACP frame. Accordingly, operation processor device 1100 may prepare a request having a data format that includes the PACP frame, by the PHY adapter layer L1.5#0 (operation ①).

The prepared request may include a command and condition value information for setting or changing a communication condition of first storage device 1301. For example, when operation processor device 1100 intends to increase bandwidth of communication with first storage device 1301, the prepared request may include a command for changing the number of lanes to be activated in the M-PHY layer L1#1a, and information associated with the number of lanes to be activated.

The prepared request may be transferred to the PHY adapter layer L1.5#1a through the M-PHY layer L1#0, the input/output ports PORT#0 and PORT#1a, and the M-PHY layer L1#1a (operation ②). For example, the prepared request may be transferred in a unit of packet, but the present disclosure is not limited thereto. The PHY adapter layer L1.5#1a may analyze a PACP frame of the transferred request.

The PHY adapter layer L1.5#1a may set or change a communication condition of the M-PHY layer L1#1a, based on the analyzed result (operation ③). For example, when the transferred request includes a command for changing the number of lanes to be activated in the M-PHY layer L1#1a, the PHY adapter layer L1.5#1a may change the number of lanes to be activated in the M-PHY layer L1#1a, based on the information included in the transferred request.

Figure 5:
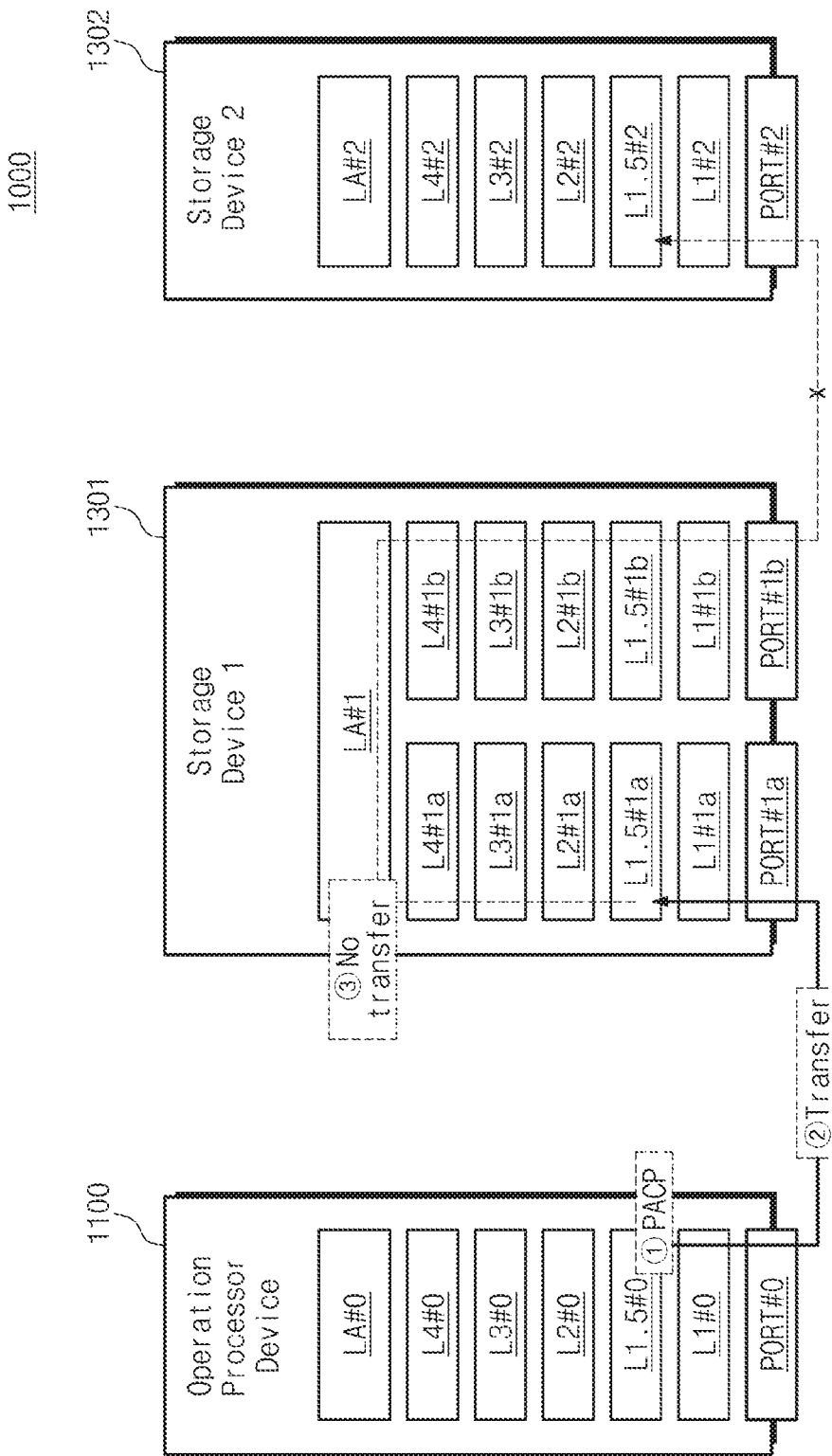
FIGS. 5 and 6 are conceptual diagrams for describing a process of controlling a storage device that is not directly connected to the operation processor device in the storage system of FIG. 1.
Figure 6:
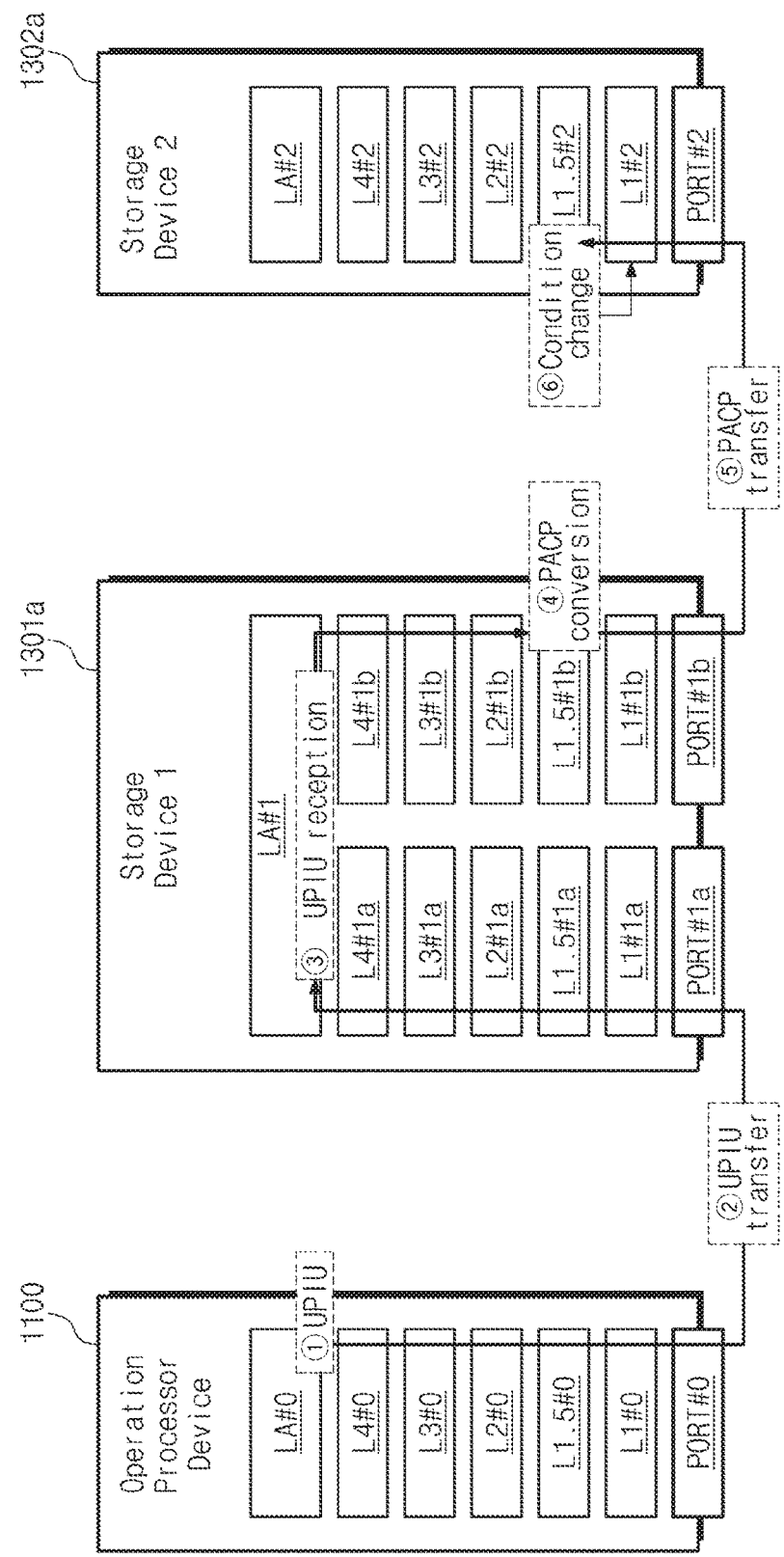

FIGS. 5 and 6 are conceptual diagrams for describing a process of controlling a storage device that is not directly connected to operation processor device 1100 in storage system 1000 of FIG. 1. For example, operation processor device 1100 may intend to control second storage device 1302 (e.g., a communication condition of second storage device 1302) that is not directly connected with operation processor device 1100.

Referring to FIG. 5, for example, operation processor device 1100 may set or change a communication condition between the M-PHY layers L1#1b and L1#2. For example, operation processor device 1100 may prepare a request having a data format that includes the PACP frame, by the PHY adapter layer L1.5#0 (operation ①). The prepared request may be transferred to the PHY adapter layer L1.5#1a through the M-PHY layer L1#0, the input/output ports PORT#0 and PORT#1a, and the M-PHY layer L1#1a (e.g., in a unit of packet) (operation ②).

However, the prepared request has the data format including the PACP frame, thus may be exchanged only between the PHY adapter layer L1.5#1a and the M-PHY layer L1#1a. That is, the prepared request of the data format including the PACP frame may not be transferred through the upper layer (e.g., the application layer LA#1) of first storage device 1301 (refer to box ③). Accordingly, the prepared request of the data format including the PACP frame may not be transferred to second storage device 1302, and operation processor device 1100 may not directly control a communication condition of the M-PHY layer L1#2.

The example embodiments may provide schemes for directly controlling a communication condition of second storage device 1302 by operation processor device 1100. FIG. 6 illustrates one of the example embodiments. In FIG. 6, storage devices 1301a and 1302a may correspond to storage devices 1301 and 1302 of FIG. 1 respectively, but may include some different or additional elements and/or perform some different or additional functions, as described in greater detail below.

First storage device 1301a may include at least one interface adaptor for supporting communication by first storage device 1301a through first and second input/output ports PORT1A and PORT1B via a protocol (e.g., the UFS protocol) having a plurality of layers, including M-PHY layers L1#1a and L1#1b, PHY adapter layers L1.5#1a and L1.5#1b, data link layers L2#1a and L2#1b, network layers L3#1a and L3#1b, transport layers L4#1a and L4#b, and the application layer LA#1. The interface adaptor may be implemented at least in part by an internal controller such as controller 1331 shown in FIG. 1. The interface adaptor may be implemented at least in part by a hardware circuit and/or a program code that is executable by a processor core. In the description to follow, when it is said that a certain layer performs an action, that action may be performed by the interface adaptor which implements the protocol having the layers. Although not shown in FIG. 6, first storage device 1301a may also include one or more nonvolatile memories such as the one or more nonvolatile memory 1311 of FIG. 1, and second storage device 1302a may include one or more nonvolatile memories such as the one or more nonvolatile memory 1312 of FIG. 1.

Operation processor device 1100 may intend to control second storage device 1302a (e.g., a communication condition of second storage device 1302a) that is not directly connected with operation processor device 1100.

For example, referring to FIG. 6, operation processor device 1100 may prepare a request having a UPIU format by the application layer LA#0 (operation ①). The application layer LA#1 may communicate and process a packet having the UPIU format. Accordingly, the request having the UPIU format may be transferred to the application layer LA#1 of first storage device 1301a (e.g., in a unit of packet) through the M-PHY layer L1#0, the input/output ports PORT#0 and PORT#1a, and the M-PHY layer L1#1a (operation ②).

The application layer LA#1 may receive the request from operation processor device 1100, and may analyze UPIU fields of the received request (operation ③). Based on the analyzed result, the application layer LA#1 may determine whether the received request is to be processed in first storage device 1301a or is associated with setting or changing a communication condition of second storage device 1302a.

For example, when the received request is to be processed in first storage device 1301a, the received request may include a command and information to be processed in the application layer LA#1. For example, when the received request is associated with setting or changing a communication condition of second storage device 1302a, the received request may include a command and condition value information for setting or changing the communication condition of second storage device 1302a.

When the received request is associated with setting or changing the communication condition of second storage device 1302a, first storage device 1301a may convert the request of the UPIU format into a request of a data format including a PACP frame (operation ④). In some example embodiments, the application layer LA#1 may convert a data format of the request, and may provide the request of the converted data format to the PHY adapter layer L1.5#1b. In some example embodiments, the application layer LA#1 may provide the PHY adapter layer L1.5#1b with the command and the information included in the request, and the PHY adapter layer L1.5#1b may reconfigure the provided command and the provided information to prepare a request of the converted data format.

The request of a data format including the PACP frame may be transferred to the PHY adapter layer L1.5#2 through the M-PHY layer L1#1b, the input/output ports PORT#1b and PORT#2, and the M-PHY layer L1#2 (e.g., in a unit of packet) (operation ⑤). The PHY adapter layer L1.5#2 may analyze the PACP frame of the transferred request. The PHY adapter layer L1.5#2 may set or change a communication condition of the M-PHY layer L1#2 based on the analyzed result (operation ⑥).

To sum up, operation processor device 1100 may transmit a request of a first format to first storage device 1301a. The first format may include a data format (e.g., the UPIU format) that is processed in the upper layer (e.g., the application layer). First storage device 1301a may convert the request of the first format received from operation processor device 1100 into a request of a second format. The second format may be different from the first format. The second format may include a data format (e.g., a data format including the PACP frame) that is processed in the lower layer (e.g., a physical layer and a link layer). First storage device 1301a may output the converted request of the second format to second storage device 1302a. The communication condition of second storage device 1302a may be changed in response to the converted request of the second format.

According to the example embodiments, operation processor device 1100 may directly control the communication condition of second storage device 1302a that is not directly connected to operation processor device 1100. In some cases, operation processor device 1100 may control the communication condition of second storage device 1302a differently from a communication condition of first storage device 1301a.

For example, while the M-PHY layer L1#1a of the first storage device 1301a operates at a high-speed (HS) mode, the M-PHY layer L1#2 of second storage device 1302a may enter a hibernate state. For example, while one lane is activated in the M-PHY layer L1#1a of first storage device 1301a, two lanes may be activated in the M-PHY layer L1#2 of second storage device 1302a.

Figure 7:
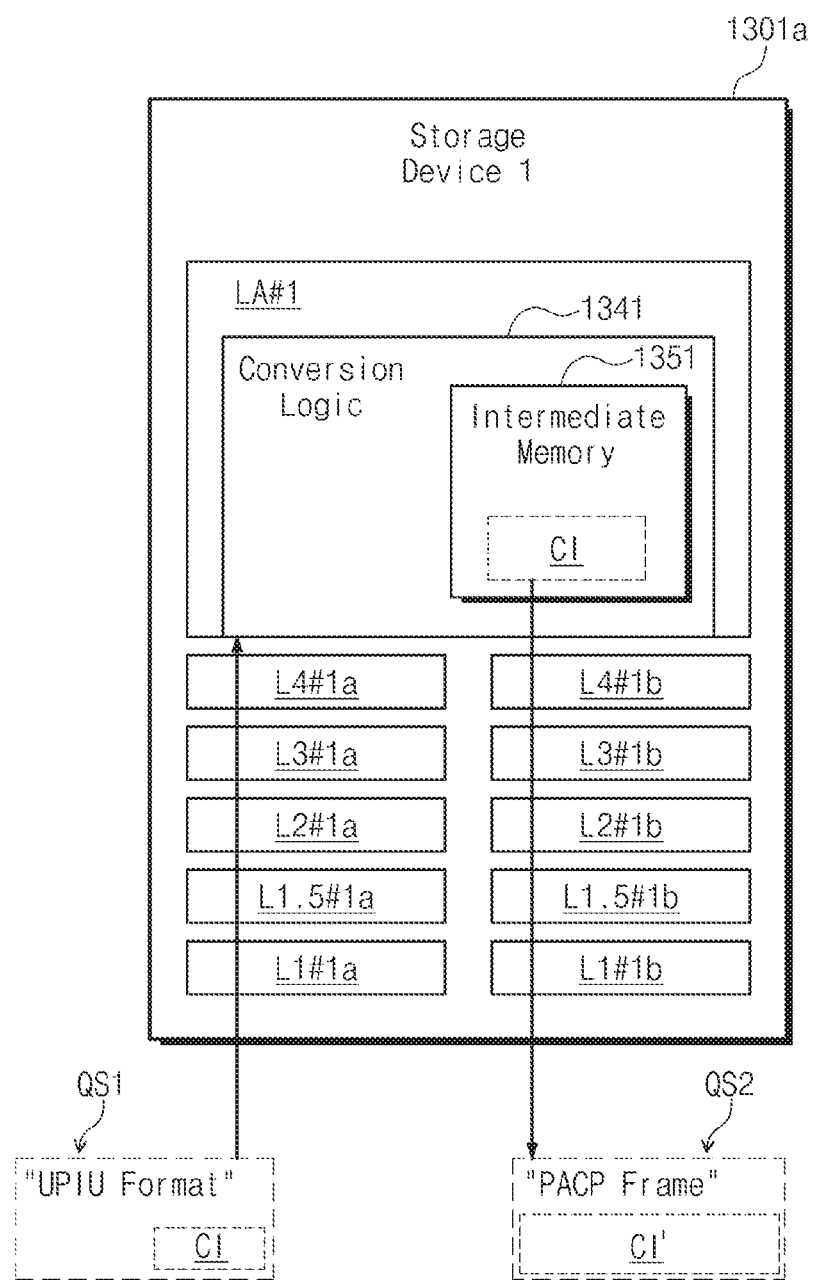
FIG. 7 is a block diagram illustrating an example embodiment of a first storage device of FIG. 6 in more detail.

FIG. 7 is a block diagram illustrating an example embodiment of first storage device 1301a of FIG. 6 in more detail. In particular, an example configuration of the application layer LA#1 of first storage device 1301a is illustrated in FIG. 7 in more detail.

As described with reference to FIG. 6, first storage device 1301a may receive a request (hereinafter referred to as a "first request QS1") having the first format (e.g., the UPIU format) from operation processor device 1100 through the lower layer. The first request QS1 may include control information CI. The control information CI may include information that is provided from operation processor device 1100 to directly control second storage device 1302a. For example, the control information CI may include a command and condition value information for setting or changing a communication condition of second storage device 1302a.

Herein, the terms "command" and "information" are used. However, the example embodiments are not limited thereto. The first request QS1 may be implemented in any form that can be transferred from operation processor device 1100 to first storage device 1301a, such as a command, a query, a message, and/or the like.

Afterwards, first storage device 1301a may convert the first request QS1, and thus may generate a request (hereinafter referred to as a "second request QS2") having the second format (e.g., a data format including the PACP frame). The second request QS2 may include control information CI' corresponding to the control information CI.

Context of the control information CI' may be substantially the same as context of the control information CI. However, the control information CI may be configured according to the first format (e.g., the control information CI may include data values that are arranged suitably for fields of the UPIU format), and the control information CI' may be configured according to the second format (e.g., the control information CI' may include data values that are arranged suitably for fields of a PACP frame). The control information CI and/or the control information CI' may be referred to change a communication condition of the second storage device 1302a.

In some example embodiments, the application layer LA#1 may be implemented at least in part with conversion logic 1341. Conversion logic 1341 may include a physical hardware circuit and/or a program code that is executable by a processor core, to perform one's own function(s).

For example, conversion logic 1341 may manage the process of converting the first request QS1 into the second request QS2. In some example embodiments, conversion logic 1341 may generate the second request QS2 by reconfiguring the control information CI included in the first request QS1. In some example embodiments, while the PHY adapter layer L1.5#1b prepares the second request QS2 based on the control information CI, conversion logic 1341 may control and manage the conversion process of the PHY adapter layer L1.5#1b.

In some example embodiments, conversion logic 1341 may include an intermediate memory 1351. For example, conversion logic 1341 may extract the control information CI from the first request QS1, and intermediate memory 1351 may store the extracted control information CI. For example, intermediate memory 1351 may include a volatile memory such as a static random access memory (SRAM) or a memory of a register type. However, the example embodiments are not limited thereto.

FIG. 7 illustrates that conversion logic 1341 includes intermediate memory 1351. However, in some example embodiments, intermediate memory 1351 may be provided separately from conversion logic 1341 or may be provided externally of hardware for the application layer LA#1.

For example, conversion logic 1341 may manage the process of generating the second request QS2 based on the control information CI that is stored in intermediate memory 1351. The second request QS2 that is prepared by conversion logic 1341 and/or the PHY adapter layer L1.5#1b may be output to second storage device 1302a through the lower layer.

As described above, the control information CI may "describe" how to set or change a communication condition of second storage device 1302a. Accordingly, intermediate memory 1351 and the control information CI may be referred to as a "descriptor" that describes a communication condition of second storage device 1302a.

As described above, conversion logic 1341 may convert the first request QS1 into the second request QS2. However, conversion logic 1341 may further perform any other functions to handle operations and issues that may occur in a serial connection structure illustrated in FIG. 1. For example, conversion logic 1341 may manage an address space of second storage device 1302a, and/or may manage a balance of the amount of stored data between first storage device 1301a and second storage device 1302a. However, the example embodiments are not limited thereto.

Figure 8A:
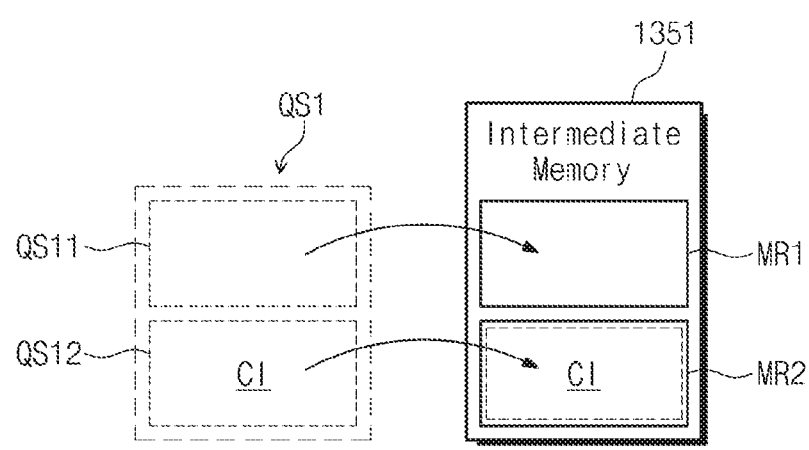
FIGS. 8A and 8B are conceptual diagrams for describing a method of handling control information that is to be provided from the first storage device of FIG. 7 to a second storage device of FIG. 6.
Figure 8B:
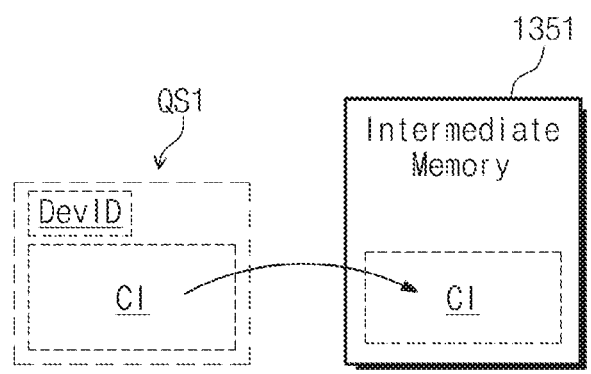

FIGS. 8A and 8B are conceptual diagrams for describing a method of handling control information that is to be provided from first storage device 1301a of FIG. 7 to second storage device 1302a of FIG. 6.

The first request QS1 may have the first format. When the application layer LA#1 receives a packet of the first format, the application layer LA#1 may determine whether the received packet is to be processed in first storage device 1301a or is configured for second storage device 1302a.

Referring to FIG. 8A, in some example embodiments, the first format of the first request QS1 may include, at least, a first field region QS11 and a second field region QS12. An index of the first field region QS11 may be different from an index of the second field region QS12. For example, the first field region QS11 may include a command and information to be processed in the application layer LA#1 of first storage device 1301a, and the second field region QS12 may include only control information CI.

Intermediate memory 1351 may include, at least, a first memory region MR1 and a second memory region MR2. Address regions allocated for the first memory region MR1 may be different from address regions allocated for the second memory region MR2. For example, the first memory region MR1 may store information to be processed in the upper layer (e.g., a command and information corresponding to the first field region QS11), and the second memory region MR2 may store only the control information CI.

According to the example embodiment of FIG. 8A, the application layer LA#1 may determine whether the first request QS1 is to be processed in first storage device 1301a or is configured for second storage device 1302a, based on a descriptor index including specific information and/or a memory address storing specific information.

Referring to FIG. 8B, in some example embodiments, the first format of the first request QS1 may include a field indicating a device identifier DevID. A value of the device identifier DevID may mean a destination device where the first request QS1 finally reaches. For example, a device identifier of first storage device 1301a may have a different value from that of a device identifier of second storage device 1302a.

According to the example embodiment of FIG. 8B, the application layer LA#1 may determine whether the first request QS1 is to be processed in first storage device 1301a or is configured for second storage device 1302a, based on the value of the device identifier DevID. When the device identifier DevID indicates a device identifier of second storage device 1302a, intermediate memory 1351 may store the control information CI extracted from the first request QS1.

Figure 9:
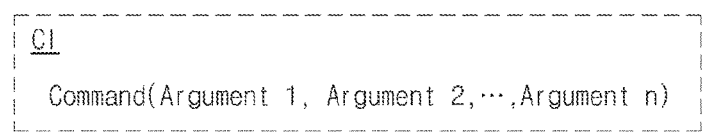
FIG. 9 is a conceptual diagram for describing a configuration of the control information of FIG. 7.

FIG. 9 is a conceptual diagram for describing a configuration of the control information CI of FIG. 7.

The control information CI may include a command for setting or changing a communication condition of second storage device 1302a. For example, the command may include a command defined in the UFS protocol (e.g., "DME_PEER_SET.req", "DME_LINKSTARTUP.req", "DME_HIBERNATE_ENTER.req", and/or the like). In addition, the control information CI may include condition value information corresponding to the command. For example, the condition value information may be in the form of a parameter or argument.

For example, when the control information CI is associated with a command "PACP_GET_req" or "PACP_SET_req", the arguments may include parameters corresponding to "MIB attribute", "GenSelectorIndex", "ResetLevel", and/or the like. For example, when the control information CI is associated with a command "PACP_PWR_req", the arguments may include parameters corresponding to "Flags", "TxMode", "TxLane", "TxGear", "RxMode", "RxLane", "RxGear", "PAPowerModeUserData", and/or the like.

For example, the commands and the arguments may have different descriptor indexes or may be stored in different memory addresses of intermediate memory 1351. Accordingly, the commands and the arguments may be distinguished and identified based on a descriptor index or memory address.

In some cases, the control information CI may include a plurality of commands and arguments respectively corresponding to the commands In this case, the control information CI may include a series of commands to be processed in second storage device 1302a. In some example embodiments, the control information CI may include a new command that is not defined in the UFS protocol and argument(s) corresponding to the new command. For example, the control information CI may include a new command for setting, in a single step or procedure, a specific communication condition that is optimized to performance of second storage device 1302a.

The control information CI may include a command and arguments for setting or changing a communication condition of a lower layer (e.g., a physical layer) of second storage device 1302a. However, the command and the arguments included in the control information CI may be arranged suitably for the first format that is processed in the upper layer. The control information CI may be extracted by conversion logic 1341, and may be stored in intermediate memory 1351. The control information CI may be reconfigured into the control information CI' to be suitable for the second format that is processed in the lower layer, and the control information CI' may be provided to second storage device 1302a.

Figure 10:
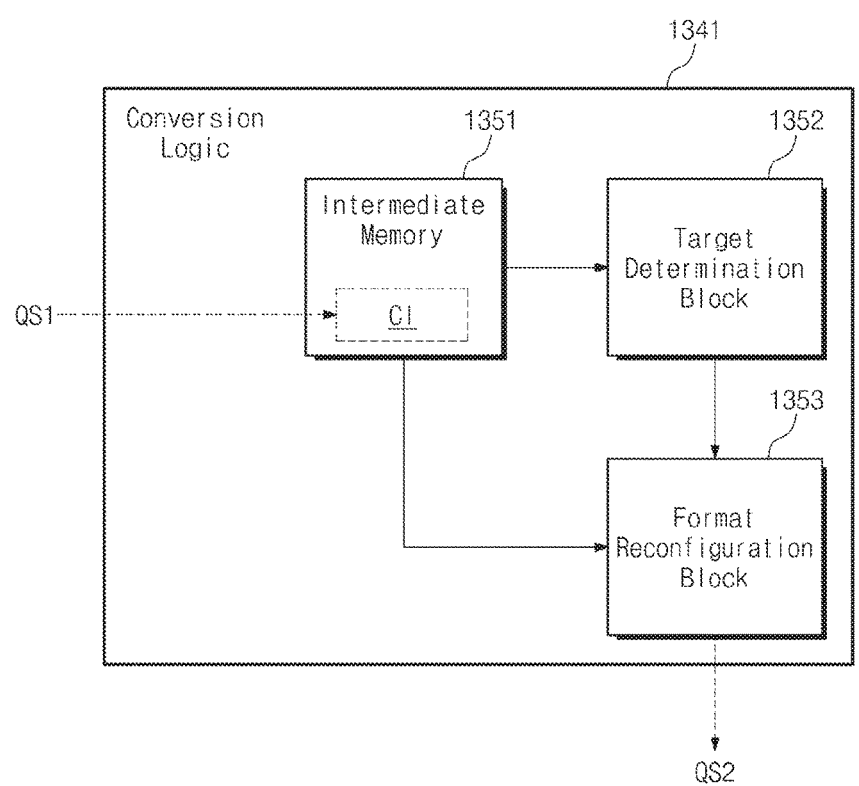
FIG. 10 is a block diagram illustrating conversion logic of FIG. 7 in more detail.

FIG. 10 is a block diagram illustrating an example embodiment of conversion logic 1341 of FIG. 7 in more detail. In some example embodiments, conversion logic 1341 may include intermediate memory 1351, a target determination block 1352, and a format reconfiguration block 1353. Each of target determination block 1352 and format reconfiguration block 1353 may include a physical hardware circuit and/or a program code that is executable by a processor core, to perform one's own function(s).

Intermediate memory 1351 may store the control information CI extracted from the first request QS1. Target determination block 1352 may determine that the first request QS1 includes the control information CI for setting or changing a communication condition of second storage device 1302a, based on a descriptor index including the control information CI and/or a memory address storing the control information CI.

Format reconfiguration block 1353 may receive the control information CI from intermediate memory 1351. Format reconfiguration block 1353 may reconfigure the control information CI in response to the determination of target determination block 1352. Accordingly, format reconfiguration block 1353 may generate the second request QS2 including the reconfigured control information CI'.

For example, in conversion logic 1341, target determination block 1352 may determine, based on the descriptor index, the memory address, and/or the device identifier DevID, whether the first request QS1 is directed to second storage device 1302a of FIG. 6 which is connected with first storage device 1301a. When it is determined that the first request QS1 is directed to second storage device 1302a, format reconfiguration block 1353 may reconfigure the control information CI such that the first request QS1 having the first format is converted to the second request QS2 having the second format. Accordingly, second storage device 1302a may receive the second request QS2 having the converted format.

On the other hand, in some examples, it may be determined that the first request QS1 is not directed to second storage device 1302a. This may mean that the first request QS1 is directed to another storage device other than second storage device 1302a (as will be described below with reference to FIG. 21, there may be three or more storage devices). In some examples, when it is determined that the first request QS1 is not directed to second storage device 1302a, conversion logic 1341 may output the second request QS2 without conversion. Accordingly, second storage device 1302a may receive the second request QS2 having the first format itself which is the same as that of the first request QS1.

Conversion logic, which is substantially identical or similar to conversion logic 1341, may be included in storage devices connected in a chain or daisy-chain structure. For example, second storage device 1302a may include conversion logic, as will be described below with reference to FIGS. 11A and 11B. When second storage device 1302a receives the second request QS2 having the first format, conversion logic of second storage device 1302a may determine to which the second request QS2 having the first format is directed.

FIG. 10 illustrates that conversion logic 1341 includes target determination block 1352 and format reconfiguration block 1353. However, in some other example embodiments, functions of the target determination block 1352 and/or format reconfiguration block 1353 may be performed in the PHY adapter layer L1.5#1b.

Figure 11A:
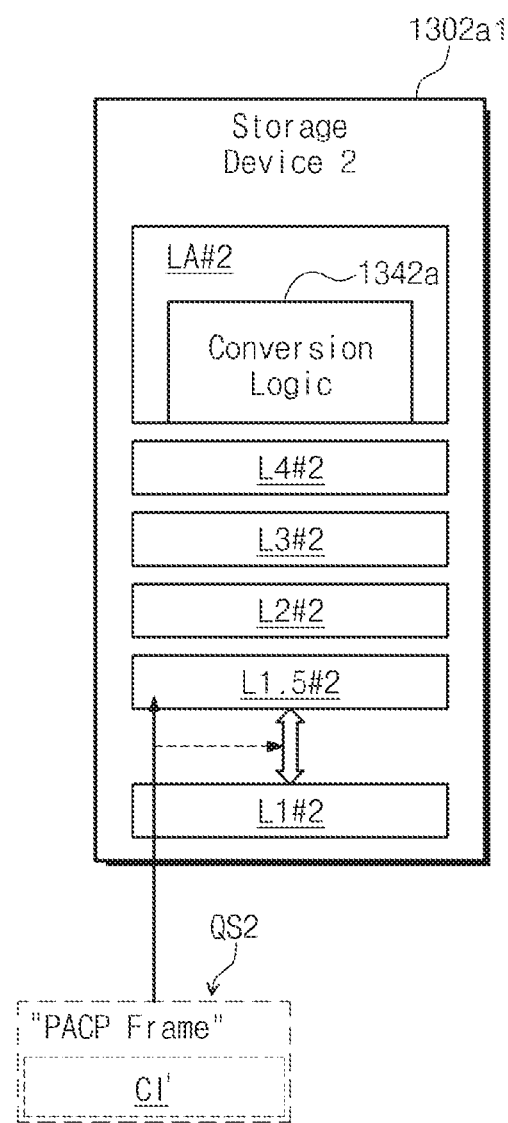
FIGS. 11A and 11B are block diagrams illustrating example configurations of the second storage device of FIG. 6.
Figure 11B:
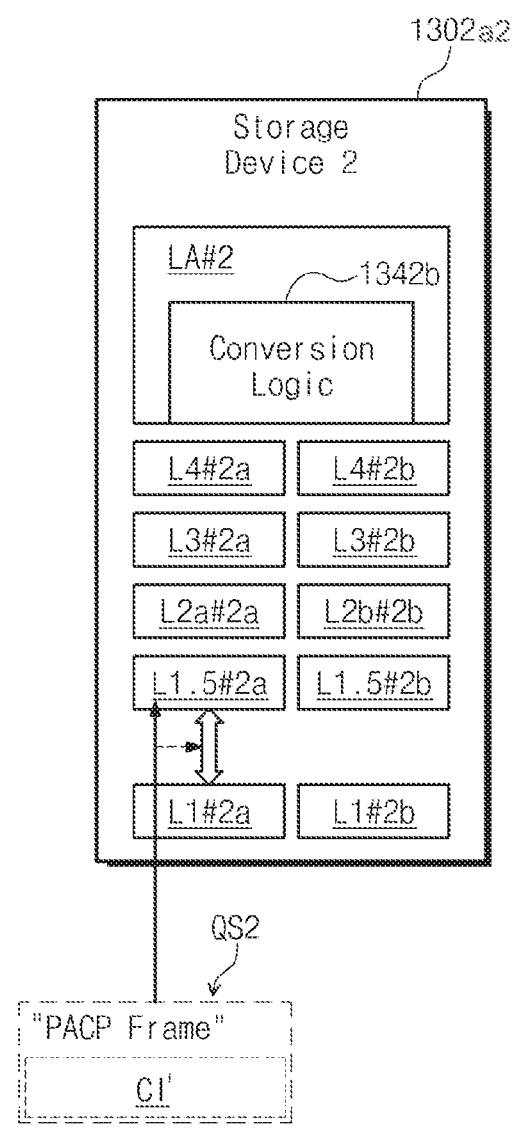

FIGS. 11A and 11B are block diagrams illustrating example configurations of second storage device 1302a of FIG. 6. In particular, FIGS. 11A and 11B illustrate second storage device 1302a1 and second storage device 1302a2, respectively, which each may be one example configuration of second storage device 1302a of FIG. 6.

Referring to FIG. 11A, second storage device 1302a1 may receive the second request QS2 from first storage device 1301a. The second request QS2 may have the second format (e.g., a data format including the PACP frame). The second request QS2 may include the control information CI'.

The control information CI' may correspond to the control information CI included in the first request QS1 of the first format (e.g., the UPIU format) output from operation processor device 1100. The PHY adapter layer L1.5#2 may set or change a communication condition of the M-PHY layer L1#2 based on the control information CI'.

In some example embodiments, the application layer LA#2 may be implemented at least in part with conversion logic 1342a. For example, second storage device 1302a1 may simply receive the second request QS2 from first storage device 1301a. In such example embodiments, unlike conversion logic 1341 of first storage device 1301a, conversion logic 1342a may not manage the process of converting a data format of the second request QS2, but may perform some other functions to handle operations and issues that may occur in the serial connection structure illustrated in FIG. 1. Accordingly, a configuration of second storage device 1302a1 may be simplified in comparison to a configuration of first storage device 1301a.

Alternatively, in some example embodiments, the application layer LA#2 may not require the conversion logic 1342a, unlike the illustration in FIG. 11A. In such example embodiments, a configuration of the second storage device 1302a may be greatly simplified.

Meanwhile, in some example embodiments, second storage device 1302a of FIG. 6 may be implemented like second storage device 1302a2 of FIG. 11B. Second storage device 1302a2 may set or change a communication condition based on the second request QS2 received from first storage device 1301a. In addition, the application layer LA#2 may be implemented at least in part with conversion logic 1342b. Conversion logic 1342b may be configured substantially the same as conversion logic 1341 of first storage device 1301a.

Electronic system 1000 of FIG. 6 is illustrated as including two electronic devices 1301a and 1302a. However, in some example embodiments, a storage system may include three or more storage devices (e.g., refer to FIG. 21). In such example embodiments, second storage device 1302a2 may transfer the control information CI (or the control information CI') to another storage device that is not directly connected to first storage device 1301a. For example, in some embodiments of a memory system, second storage device 1302b may have the same configuration as first storage device 1301a.

To this end, a communication or interface protocol (e.g., the UFS protocol) which is employed by the second storage device 1302a2 may include a M-PHY layer L1#2a, a PHY adapter layer L1.5#2a, a data link layer L2#2a, a network layer L3#2a, and a transport layer L4#2a, to communicate with first storage device 1301a and may further include a M-PHY layer L1#2b, a PHY adapter layer L1.5#2b, a data link layer L2#2b, a network layer L3#2b, and a transport layer L4#2b, to communicate with another storage device that is not directly connected to first storage device 1301a. Furthermore, conversion logic 1342b may manage the process of converting a data format between packets exchanged at different layers.

As described with reference to FIGS. 11A and 11B, a configuration of second storage device 1302a may be variously changed or modified.

Figure 12:
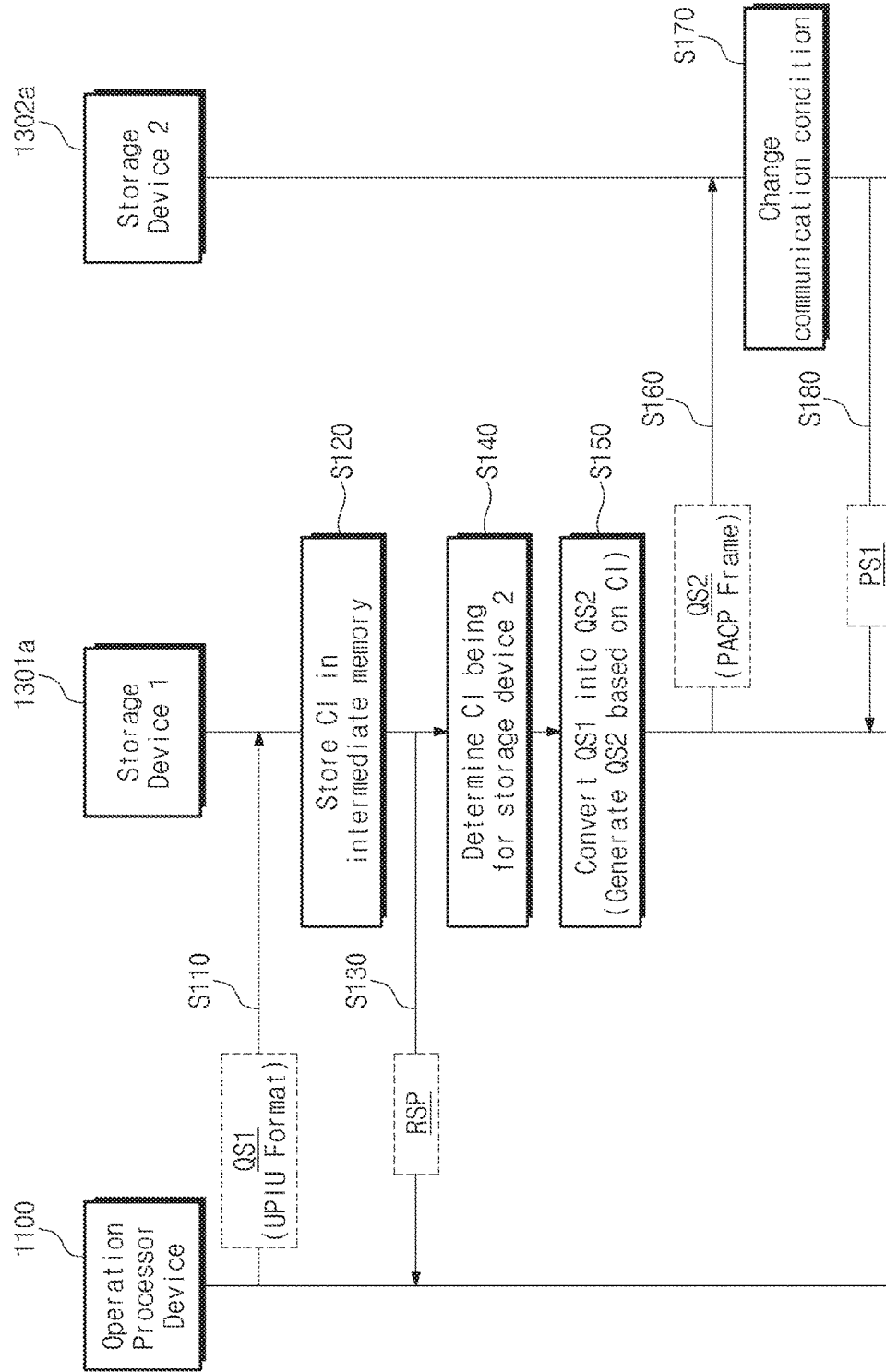
FIG. 12 is a flowchart describing communication that is performed in the storage system of FIG. 6 according to the control process of FIG. 6.

FIG. 12 is a flowchart describing an example of communication that may be performed in storage system 1000 of FIG. 6 according to the control process of FIG. 6. Storage devices 1301a and 1302a may process the communication of FIG. 12 according to operations of internal interface adaptors which may comprise controllers 1331 and 1332 respectively, shown in FIG. 1.

In operation S110, first storage device 1301a may receive the first request QS1 from operation processor device 1100. The first request QS1 may have the first format (e.g., the UPIU format) to be processed in the upper layer of the interface protocol which is implemented by first storage device 1301a. In operation S120, first storage device 1301a may store the control information CI included in the first request QS1 in intermediate memory 1351. In operation S130, first storage device 1301a may transmit a response RSP corresponding to the first request QS1 to operation processor device 1100. For example, the response RSP may indicate that the first request QS1 has been well received.

In operation S140, first storage device 1301a may determine that the control information CI is not configured for controller 1331. For example, first storage device 1301a may determine that the control information CI is configured for second storage device 1302a, based on a descriptor index and/or a memory address.

In operation S150, first storage device 1301a may convert the first request QS1 into the second request QS2. For example, first storage device 1301a may reconfigure the control information CI to generate the second request QS2 including the control information CI'. The second request QS2 may have the second format to be processed in the lower layer (e.g., a data format including the PACP frame).

In operation S160, first storage device 1301a may provide the second request QS2 to second storage device 1302a. In operation S170, second storage device 1302a may set or change a communication condition based on the control information CI' included in the second request QS2. In operation S180, second storage device 1302a may output a first response PS1 corresponding to the second request QS2 to first storage device 1301a. The first response PS1 will be described with reference to FIGS. 13 and 14.

Figure 13:
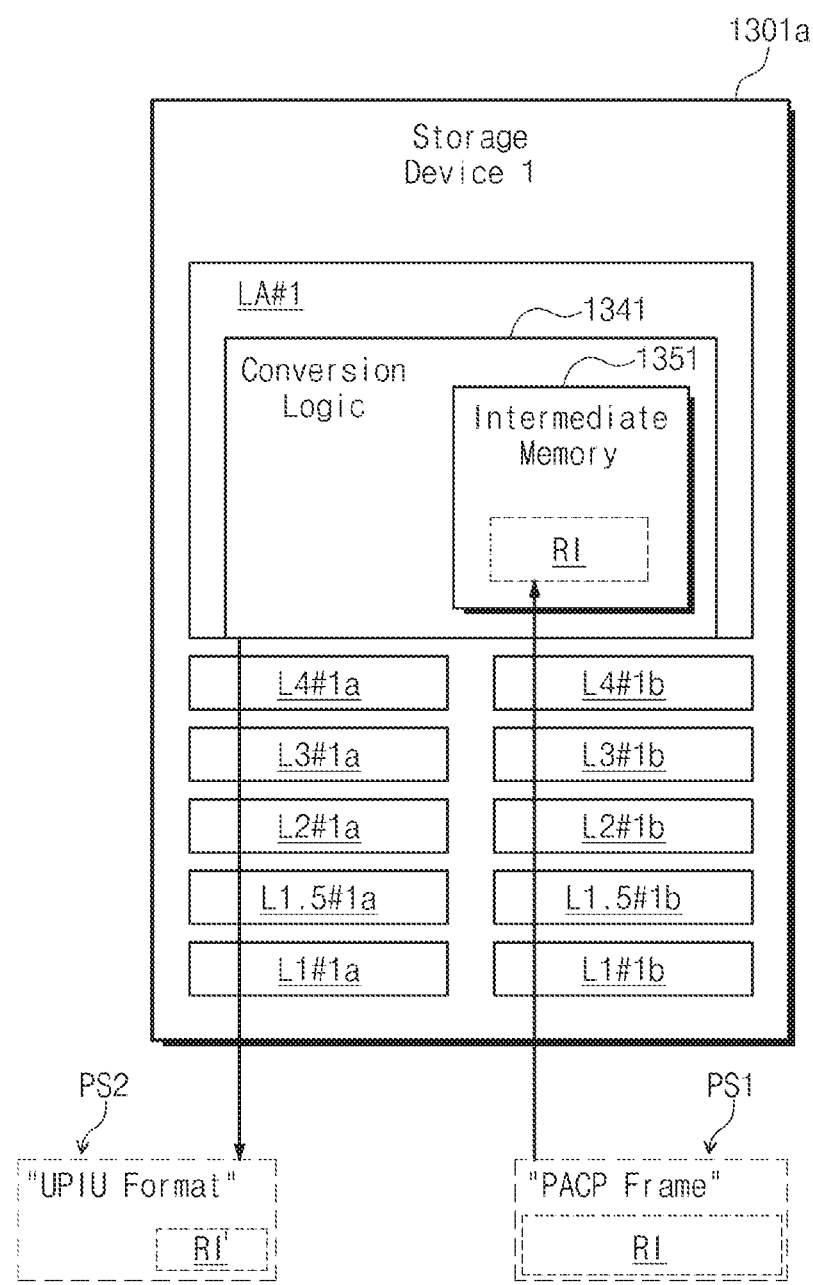
FIG. 13 is a block diagram for describing a response process corresponding to the control process of FIG. 6.

FIG. 13 is a block diagram for describing an example of a response process corresponding to the control process of FIG. 6.

Second storage device 1302a may set or change a communication condition based on the second request QS2. In some example embodiments, second storage device 1302a may output the first response PS1 to inform first storage device 1301a of success or failure in changing the communication condition. First storage device 1301a may receive the first response PS1 from second storage device 1302a through the lower layer of the interface protocol which is implemented by first and second storage devices 1301a and 1302a, in response to the success or failure in changing the communication condition of second storage device 1302a.

The first response PS1 may have the second format to be processed in the lower layer (e.g., a data format including the PACP frame) of the interface protocol which is implemented by first and second storage devices 1301a and 1302a. For example, the first response PS1 may be a PACP response that is defined in the UFS protocol. The first response PS1 may include result information RI. The result information RI may include information associated with whether a communication condition of second storage device 1302a is successfully changed or an error/failure occurs. For example, the result information RI may include a field "ConfigResultCode" that is defined in the UFS protocol.

In addition, first storage device 1301a may convert the first response PS1 to generate a second response PS2. The second response PS2 may have the first format to be processed in the upper layer (e.g., the UPIU format) of the interface protocol which is implemented by first storage device 1301a. The second response PS2 may include result information RI' corresponding to the result information RI.

Context of the result information RI' may be substantially the same as context of the result information RI. However, the result information RI may be configured according to the second format, and the result information RI' may be configured according to the first format.

First storage device 1301a may output the second response PS2 through the lower layer for operation processor device 1100. The second response PS2 may be transmitted to operation processor device 1100. Operation processor device 1100 may determine success or failure in changing a communication condition of second storage device 1302a, based on the second response PS2. For example, the application layer LA#0 of operation processor device 1100 may analyze UPIU fields of the result information RI' included in the second response PS2. Operation processor device 1100 may determine the success or failure in changing the communication condition of second storage device 1302a, based on the analyzed result.

In some example embodiments, intermediate memory 1351 may store the result information RI included in the first response PS1. In some example embodiments, conversion logic 1341 may reconfigure the result information RI to generate the result information RI', and may generate the second response PS2 including the result information RI'. Accordingly, in the upper layer of controller 1331, the first response PS1 may be converted into the second response PS2.

Similarly to the example embodiment described with reference to FIG. 8A, intermediate memory 1351 may include, at least, the first memory region and a third memory region that are respectively allocated to different address regions. For example, the third memory region may store the result information RI. In such example embodiments, the application layer LA#1 may distinguish and identify the result information RI for operation processor device 1100, based on a descriptor index and/or a memory address.

Figure 14:
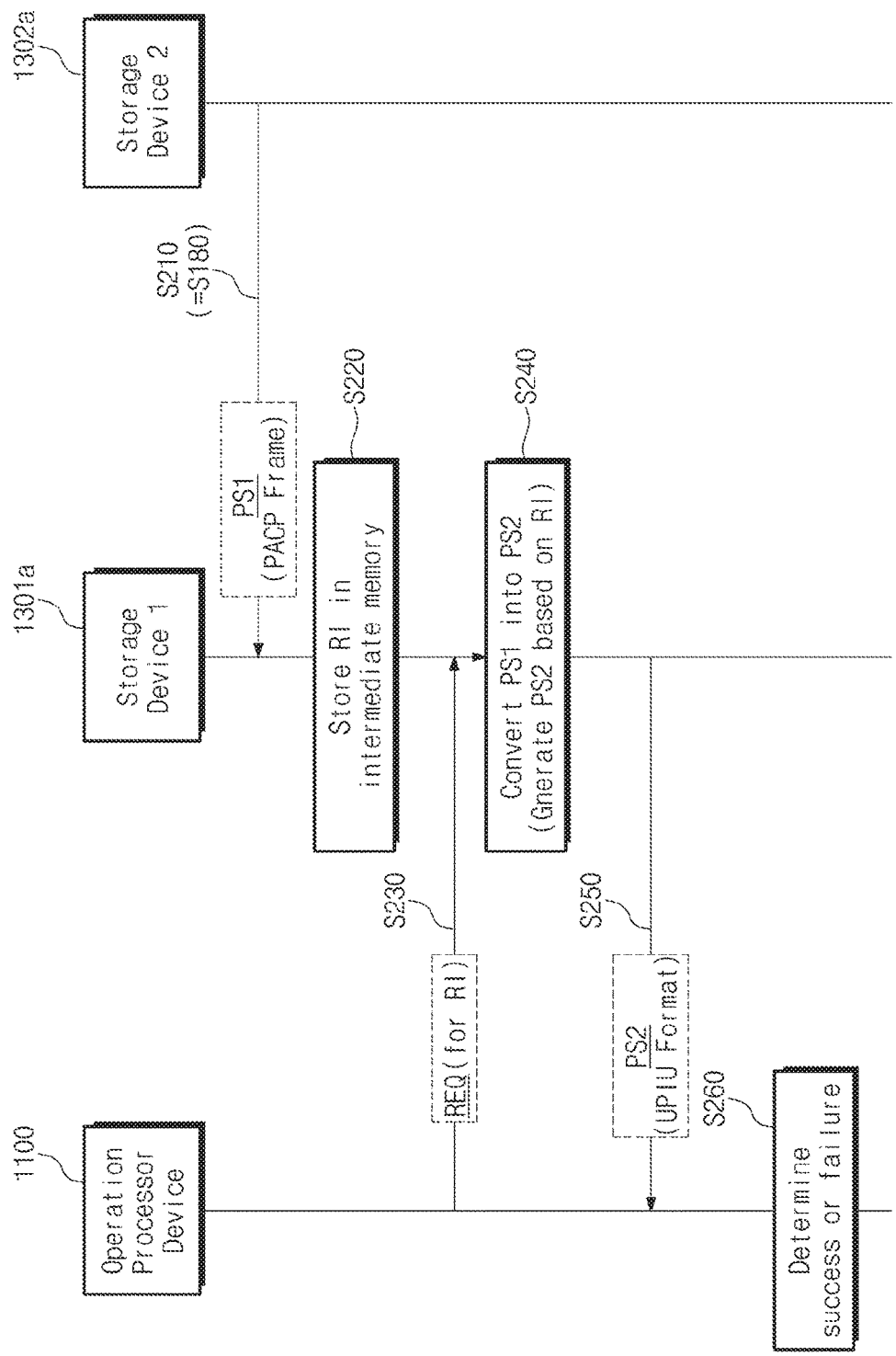
FIG. 14 is a flowchart describing communication that is performed in the storage system of FIG. 6 according to the response process of FIG. 13.

FIG. 14 is a flowchart describing an example of communication that may be performed in storage system 1000 of FIG. 6 according to the response process of FIG. 13. Storage devices 1301a and 1302a may process the communication of FIG. 14 according to operations of internal interface adaptors which may comprise controllers 1331 and 1332, respectively, shown in FIG. 1.

In operation S210, second storage device 1302a may output the first response PS1 corresponding to the second request QS2 to first storage device 1301a. Accordingly, first storage device 1301a may receive the first response PS1 from second storage device 1302a, in response to success or failure in changing a communication condition of second storage device 1302a. In operation S220, first storage device 1301a may store the result information RI included in the first response PS1 in intermediate memory 1351.

In operation S230, first storage device 1301a may receive confirm request REQ for the result information RI from operation processor device 1100. Operation processor device 1100 may access the result information RI by providing the confirm request REQ.

In operation S240, first storage device 1301a may convert the first response PS1 into the second response PS2, in response to the confirm request REQ. For example, first storage device 1301a may reconfigure the result information RI to generate the second response PS2 including the result information RI'.

In operation S250, first storage device 1301a may provide the second response PS2 to operation processor device 1100. In operation S260, operation processor device 1100 may determine the success or failure in changing a communication condition of second storage device 1302a, based on the second response PS2.

When the communication condition is changed, second storage device 1302a may operate in the changed communication condition. On the other hand, when operation processor device 1100 determines the failure in changing the communication condition, operation processor device 1100 may perform subsequent operations to understand and recognize any problem or issue. For example, operation processor device 1100 may try to change the communication condition once again. For example, when the failure occurs due to the limitation in capability of second storage device 1302a, operation processor device 1100 may request a change to a new communication condition that is different from the failed communication condition.

FIG. 14 illustrates that first storage device 1301a may output the second response PS2 in response to the confirm request REQ of operation processor device 1100. Meanwhile, in some example embodiments, first storage device 1301a may actively provide the second response PS2 to operation processor device 1100 without the confirm request REQ. In such example embodiments, operation processor device 1100 may transmit a response indicating that the second response PS2 has been well received, to first storage device 1301a.

Figure 15:
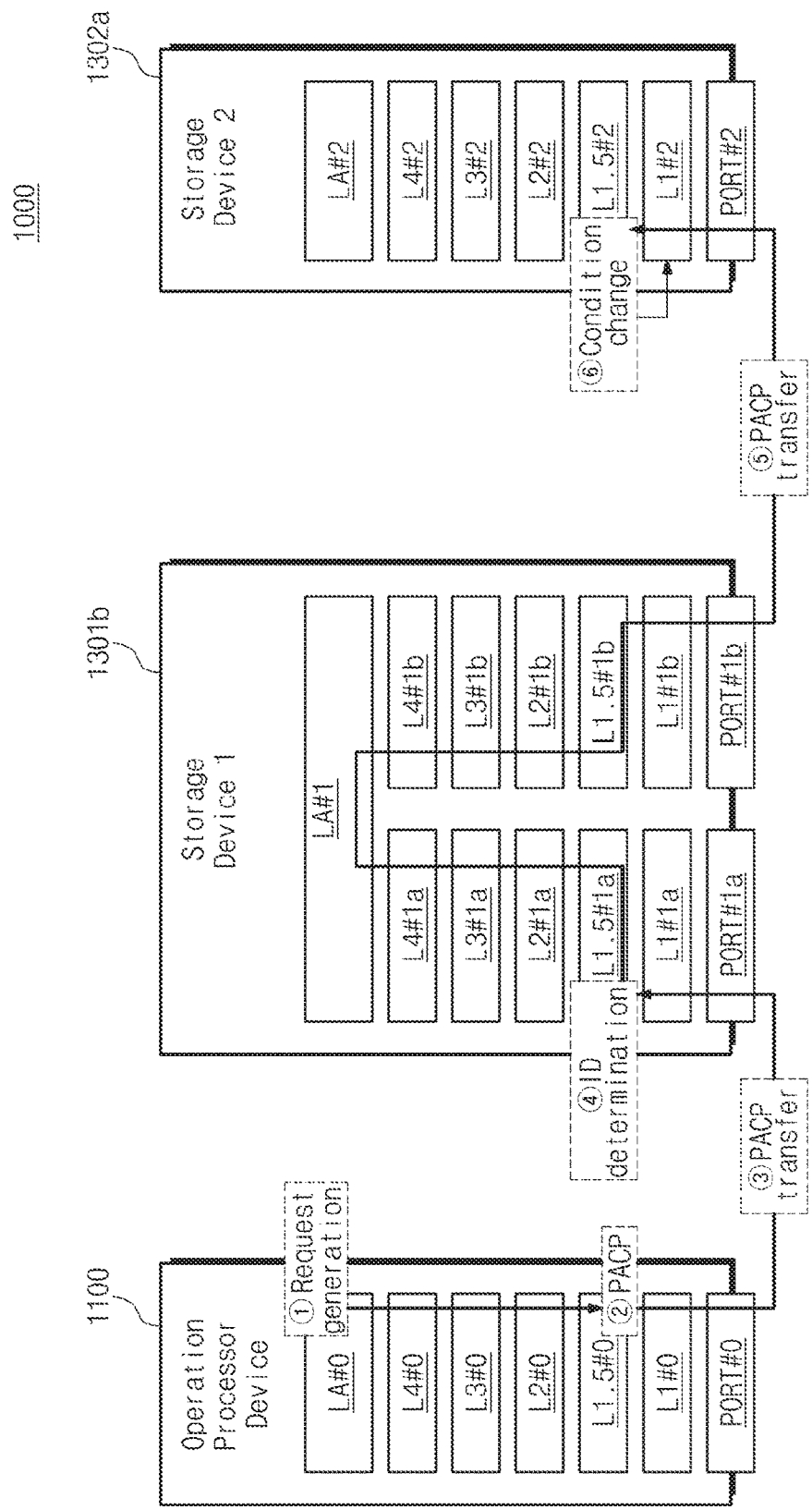
FIG. 15 is a conceptual diagram for describing a process of controlling a storage device that is not directly connected to the operation processor device in the storage system of FIG. 1.

FIG. 15 is a conceptual diagram for describing a process of controlling a storage device that is not directly connected to operation processor device 1100 in storage system 1000 of FIG. 1. First storage device 1301b of FIG. 15 may correspond to first storage device 1301a of FIG. 6. First storage device 1301b may include at least one interface adaptor for supporting communication by first storage device 1301b through first and second input/output ports PORT1A and PORT1B via a protocol (e.g., the UFS protocol) having a plurality of layers, including M-PHY layers L1#1a and L1#1b, PHY adapter layers L1.5#1a and L1.5#1b, data link layers L2#1a and L2#1b, network layers L3#1a and L3#1b, transport layers L4#1a and L4#1b, and the application layer LA#1. The interface adaptor may be implemented at least in part by an internal controller such as controller 1331 shown in FIG. 1. The interface adaptor may be implemented at least in part by a hardware circuit and/or a program code that is executable by a processor core. In the description to follow, when it is said that a certain layer performs an action, that action may be performed by the interface adaptor which implements the protocol having the layers. Although not shown in FIG. 15, first storage device 1301b may also include one or more nonvolatile memories such as the one or more nonvolatile memory 1311 of FIG. 1, and second storage device 1302a may include one or more nonvolatile memories such as the one or more nonvolatile memory 1312 of FIG. 1.

Operation processor device 1100 may intend to control second storage device 1302a (e.g., a communication condition of second storage device 1302a) that is not directly connected with operation processor device 1100. For example, the application layer LA#0 of operation processor device 1100 may generate a request for setting or changing a communication condition between the M-PHY layers L1#1b and L1#2 (operation ①). The PHY adapter layer L1.5#0 may prepare to transmit the generated request (operation ②). In the example embodiment of FIG. 15, the prepared request may include a data frame (e.g., the PACP frame) having a data format to be processed in the lower layer (e.g., a link layer and a physical layer).

However, as described with reference to FIG. 5, the request having a data format to be processed in the lower layer may not be transferred to second storage device 1302a that is not directly connected to operation processor device 1100. Accordingly, in the example embodiment of FIG. 15, the request may be implemented with a data frame including a field of a "port identifier". A value of the port identifier may indicate an input/output port of a destination device where the request finally reaches. For example, an identifier of the port PORT#1a of first storage device 1301b may have a value that is different from that of an identifier of the input/output port PORT#2 of second storage device 1302a, and the identifiers of the input/output ports PORT#1a and PORT#2 may be referred to identify first storage device 1301b and second storage device 1302a. Such a request will be described in detail with reference to FIGS. 16A to 18.

The prepared request may be transferred to the PHY adapter layer L1.5#1a of first storage device 1301b through the M-PHY layer L1#0, the input/output ports PORT#0 and PORT#1a, and the M-PHY layer L1#1a (operation ③). In some example embodiments, the prepared request may be transferred in a unit of packet. However, the example embodiments are not limited thereto. The PHY adapter layer L1.5#1a may determine a port identifier included in the request, by itself or under involvement of the application layer LA#1 (operation ④).

In some cases, the port identifier may indicate an input/output port of first storage device 1301b. This may mean that the request received from operation processor device 1100 is sent to first storage device 1301b. In this case, first storage device 1301b may analyze and process the data frame of the request, and may set or change a communication condition of first storage device 1301b.

In some cases, the port identifier may not correspond to first storage device 1301b. This may mean that the request received from operation processor device 1100 is sent to another storage device (e.g., the second storage device 1302a) other than first storage device 1301b. In this case, first storage device 1301b may transfer the request to second storage device 1302a such that a communication condition of second storage device 1302a is set or changed. Such the request may be provided to the PHY adapter layer L1.5#2 of second storage device 1302a through the M-PHY layer L1#1b, the input/output ports PORT#1b and PORT#2, and the M-PHY layer L1#2 (operation ⑤).

The request transferred to second storage device 1302a may include the port identifier indicating an input/output port of second storage device 1302a, and may further include control information output from operation processor device 1100 to set or change a communication condition of second storage device 1302a. The PHY adapter layer L1.5#2 may analyze the data frame (e.g., the PACP frame) of the transferred request. The PHY adapter layer L1.5#2 may set or change a communication condition of the M-PHY layer L1#2 based on the analyzed result (operation ⑥).

According to the example embodiments, the request having a data format to be processed in the lower layer may be transferred to second storage device 1302a that is not directly connected to operation processor device 1100. Accordingly, operation processor device 1100 may directly control the communication condition of second storage device 1302a that is not directly connected to operation processor device 1100.

Figure 16A:
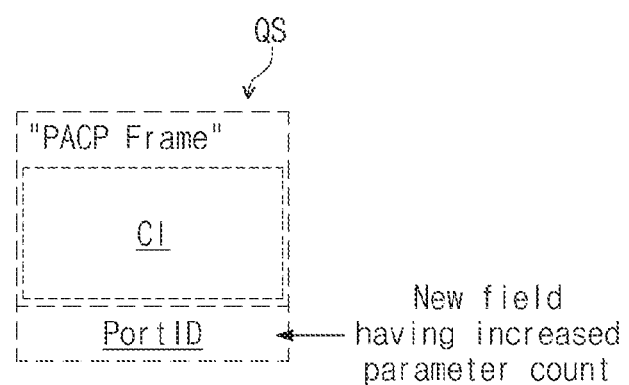
FIGS. 16A and 16B are conceptual diagrams for describing a method of generating and handling a request in the storage system of FIG. 15.
Figure 16B:
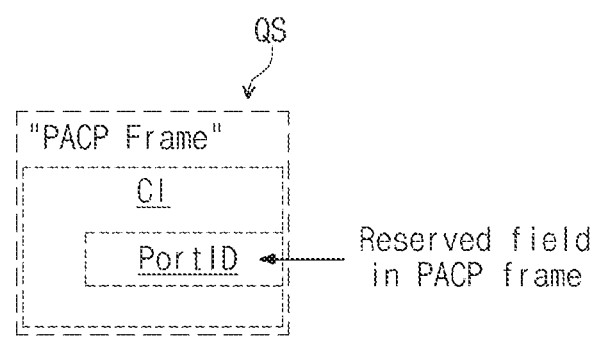

FIGS. 16A and 16B are conceptual diagrams for describing a method of generating and handling a request in storage system 1000 of FIG. 15.

Referring to FIGS. 16A and 16B, a request QS may include a data frame having a data format that is processed in the lower layer (e.g., the PACP frame). The data frame of the request QS may include the control information CI that is referred to set or change a communication condition of second storage device 1302a. The control information CI may include a command and condition value information for setting or changing the communication condition of second storage device 1302a. For example, the command may include PACP functions and/or a "TRG_UPRx" message that are defined in the UFS protocol. For example, the condition value information may further include parameter(s) or argument(s) corresponding to the command.

Meanwhile, the data frame of the request QS may further include a port identifier PortID indicating an input/output port of second storage device 1302a. In the example embodiments, the port identifier PortID may not be provided separately from the data frame of the request QS, but it may be inserted into the data frame of the request QS. That is, the data frame of the request QS may be reconfigured to include a field of the port identifier PortID. For example, the port identifier PortID may be provided as a parameter or an argument of the command.

Referring to FIG. 16A, in some example embodiments, the port identifier PortID may be included in a new field that has an increased parameter count in the data frame of the request QS. Each of fields constituting the data frame of the request QS may have one's own parameter count. The port identifier PortID may be included in the new field having a new parameter count that is different from parameter counts of existing fields, such that the existing fields are not changed or modified.

Alternatively, referring to FIG. 16B, in some example embodiments, the port identifier PortID may be included in a reserved field of the data frame of the request QS. For example, the port identifier PortID may be included in a reserved field among fields of the PACP frame defined in the UFS protocol.

Figure 17A:
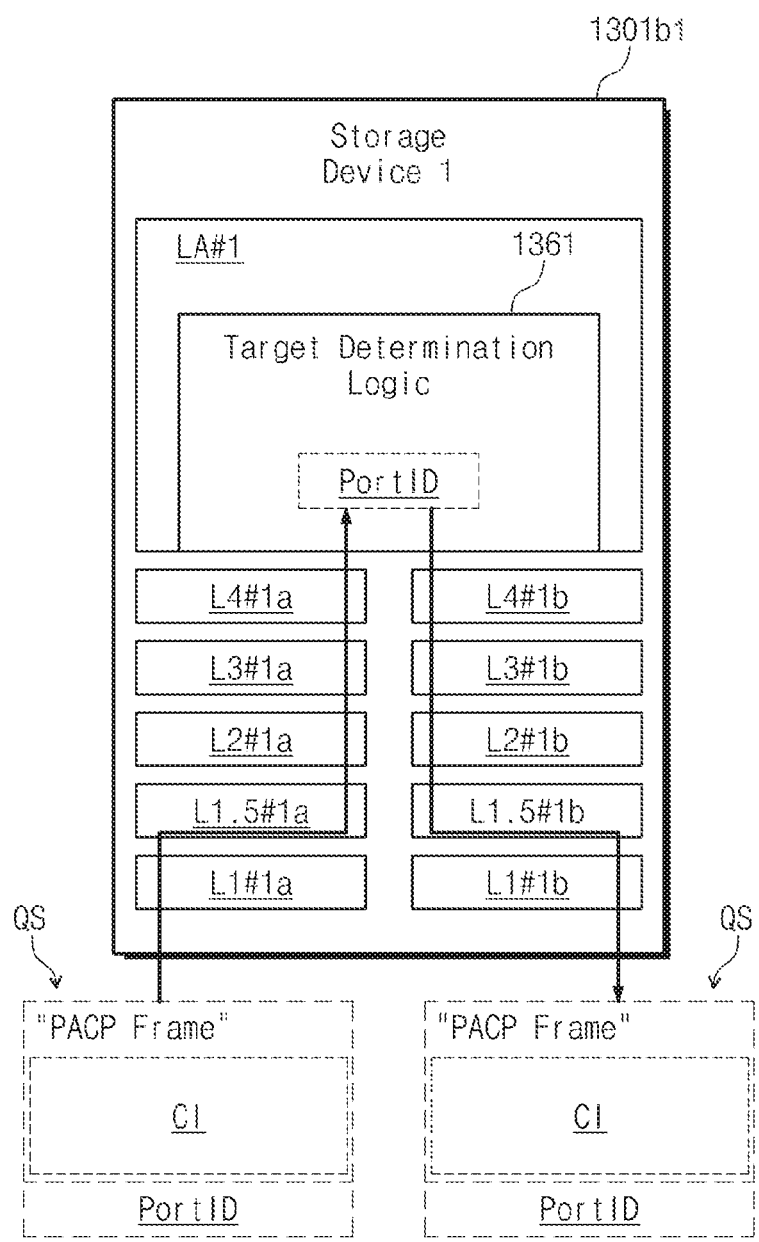
FIGS. 17A and 17B are block diagrams illustrating example configurations of the first storage device of FIG. 15.
Figure 17B:
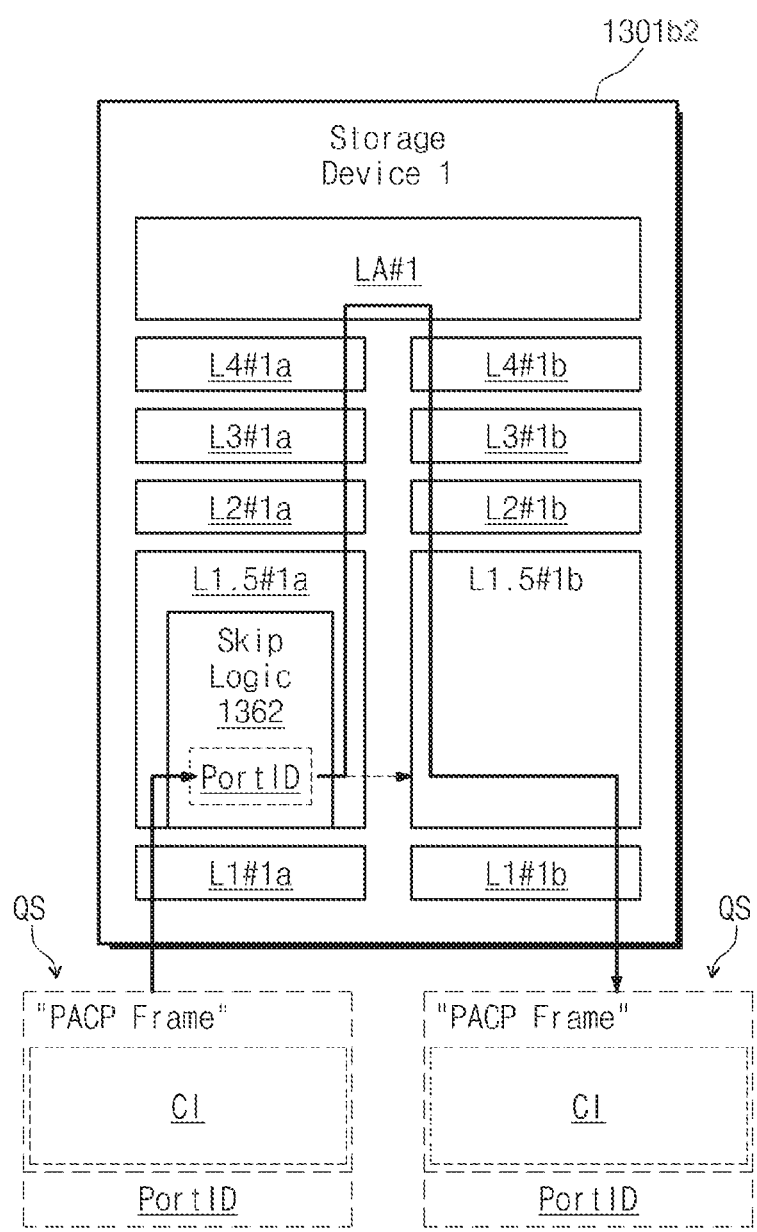

FIGS. 17A and 17B are block diagrams illustrating example configurations of first storage device 1301b of FIG. 15. In particular, FIGS. 17A and 17B illustrate first storage device 1301b1 and first storage device 1301b2, respectively, which each may be one example configuration of second storage device 1301b of FIG. 15.

Referring to FIG. 17A, first storage device 1301b1 may receive the request QS from operation processor device 1100 through the lower layer. For example, it will be assumed that the request QS is configured as described with reference to FIG. 16A. However, a configuration of the request QS may be variously changed or modified.

In some example embodiments, the application layer LA#1 may be implemented at least in part with target determination logic 1361. Target determination logic 1361 may include a physical hardware circuit and/or a program code that is executable by a processor core, to perform one's own function(s).

For example, the application layer LA#1 or the processor core of controller 1331 may monitor whether the PHY adapter layer L1.5#1a receives the request QS. When the PHY adapter layer L1.5#1a receives the request QS, target determination logic 1361 may determine whether the port identifier PortID included in the request QS corresponds to first storage device 1301b1 or second storage device 1302a.

When it is determined that the port identifier PortID indicates an input/output port of second storage device 1302a, the request QS may be transferred to second storage device 1302a through the lower layer of first storage device 1301b1. In some example embodiments, the request QS received by first storage device 1301b1 may be transferred to second storage device 1302a without modification or change. In some example embodiments, first storage device 1301b1 may remove a field of the port identifier PortID from the request QS, and then may transfer the changed request QS to second storage device 1302a.

Meanwhile, in some example embodiments, first storage device 1301b of FIG. 15 may be implemented like first storage device 1301b2 of FIG. 17B. Referring to FIG. 17B, the PHY adapter layer L1.5#1a may include skip logic 1362. Skip logic 1362 may include a physical hardware circuit and/or a program code that is executable by a processor core, to perform one's own function(s).

When the PHY adapter layer L1.5#1a receives the request QS, skip logic 1362 may determine whether the port identifier PortID included in the request QS corresponds to first storage device 1301b2 or second storage device 1302a. When it is determined that the port identifier PortID indicates an input/output port of second storage device 1302a, the request QS may be transferred to second storage device 1302a through the lower layer of first storage device 1301b2.

In some example embodiments, the request QS may be output from first storage device 1301b2 under intervention of the application layer LA#1 or processor core of the controller 1331. In some example embodiments, a direct path may be provided between the PHY adapter layers L1.5#1a and L1.5#1b. In such example embodiments, when skip logic 1362 determines that the port identifier PortID indicates the input/output port of second storage device 1302a, the request QS may be output from first storage device 1301b2 along the direct path without intervention of the application layer LA#1 or the processor core of controller 1331.

Second storage device 1302a may be configured as described with reference to FIG. 11A or as described with reference to FIG. 11B, for example. For brevity, redundant descriptions for the second storage device 1302a will be omitted below.

Figure 18:
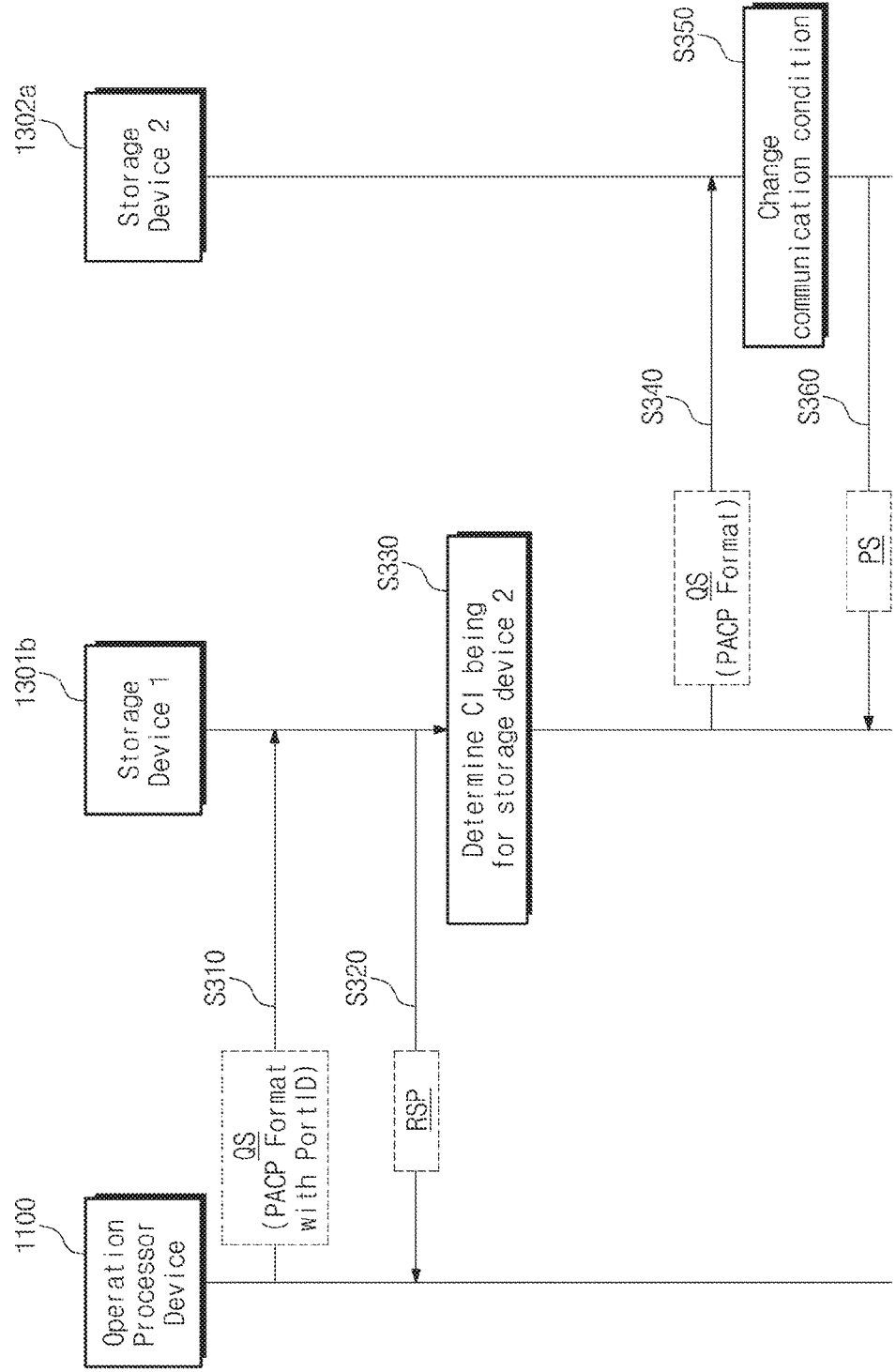
FIG. 18 is a flowchart describing communication that is performed in the storage system of FIG. 15 according to the control process of FIG. 15.

FIG. 18 is a flowchart describing an example communication that may be performed in the storage system 1000 of FIG. 15 according to the control process of FIG. 15. Storage devices 1301b and 1302a may process the communication of FIG. 18 according to operations of internal interface adaptors, which may comprise controllers 1331 and 1332 respectively, shown in FIG. 1.

In operation S310, first storage device 1301b may receive the request QS from operation processor device 1100. The request QS may include a data frame (e.g., the PACP frame) having a data format that is processed in the lower layer. In operation S320, first storage device 1301b may transmit a response RSP corresponding to the request QS to operation processor device 1100. For example, the response RSP may indicate that the request QS has been well received.

In operation S330, first storage device 1301b may determine that the port identifier PortID included in the data frame of the request QS does not correspond to first storage device 1301b. For example, first storage device 1301b may determine that the port identifier PortID indicates an input/output port of second storage device 1302a. In operation S340, first storage device 1301b may transfer the request QS to second storage device 1302a.

In operation S350, second storage device 1302a may set or change a communication condition based on the control information CI included in the request QS. In operation S360, second storage device 1302a may output the response PS corresponding to the request QS to first storage device 1301b. The response PS will be described with reference to FIGS. 19 and 20.

Figure 19:
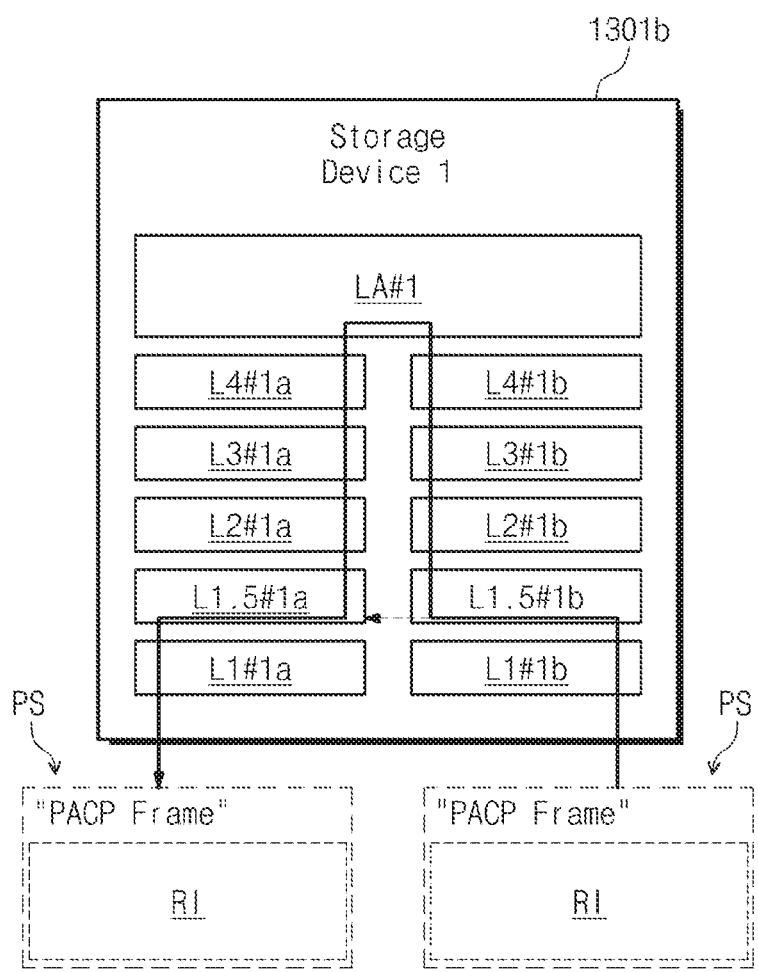
FIG. 19 is a block diagram for describing a response process corresponding to the control process of FIG. 15.

FIG. 19 is a block diagram for describing a response process corresponding to the control process of FIG. 15.

Second storage device 1302a may set or change a communication condition based on the request QS. In some example embodiments, second storage device 1302a may output the response PS to inform first storage device 1301b of success or failure in changing the communication condition. First storage device 1301b may receive the response PS from second storage device 1302a through the lower layer, in response to the success or failure in changing the communication condition of second storage device 1302a.

The response PS may include a data frame having a data format to be processed in the lower layer (e.g., the PACP frame). For example, the response PS may be a PACP response defined in the UFS protocol. The response PS may include result information RI. The result information RI may include information associated with whether a communication condition of second storage device 1302a is successfully changed or an error/failure occurs. For example, the result information RI may include a field "ConfigResultCode" that is defined in the UFS protocol.

First storage device 1301b may transfer the response PS to operation processor device 1100 through the lower layer. In some example embodiments, the response PS may be output from first storage device 1301b under intervention of the application layer LA#1 or the processor core of controller 1331. In some example embodiments, when a direct path is provided between the PHY adapter layer L1.5#1a and L1.5#1b, the response PS may be output from first storage device 1301b along the direct path without intervention of the application layer LA#1 or the processor core of controller 1331.

The output response PS may be transmitted to operation processor device 1100. Operation processor device 1100 may determine success or failure in changing a communication condition of second storage device 1302a, based on the response PS. For example, operation processor device 1100 may analyze the PACP frame of the result information RI included in the response PS. Operation processor device 1100 may determine the success or failure in changing the communication condition of second storage device 1302a, based on the analyzed result.

A destination device of the response PS may be operation processor device 1100. Accordingly, in some example embodiments, a data frame of the response PS may not include a field of the port identifier PortID, and may be designed such that a default path transferring the response PS is connected to operation processor device 1100. However, in some example embodiments, the data frame of the response PS may include a field of the port identifier PortID indicating the input/output port PORT#0 of operation processor device 1100.

Figure 20:
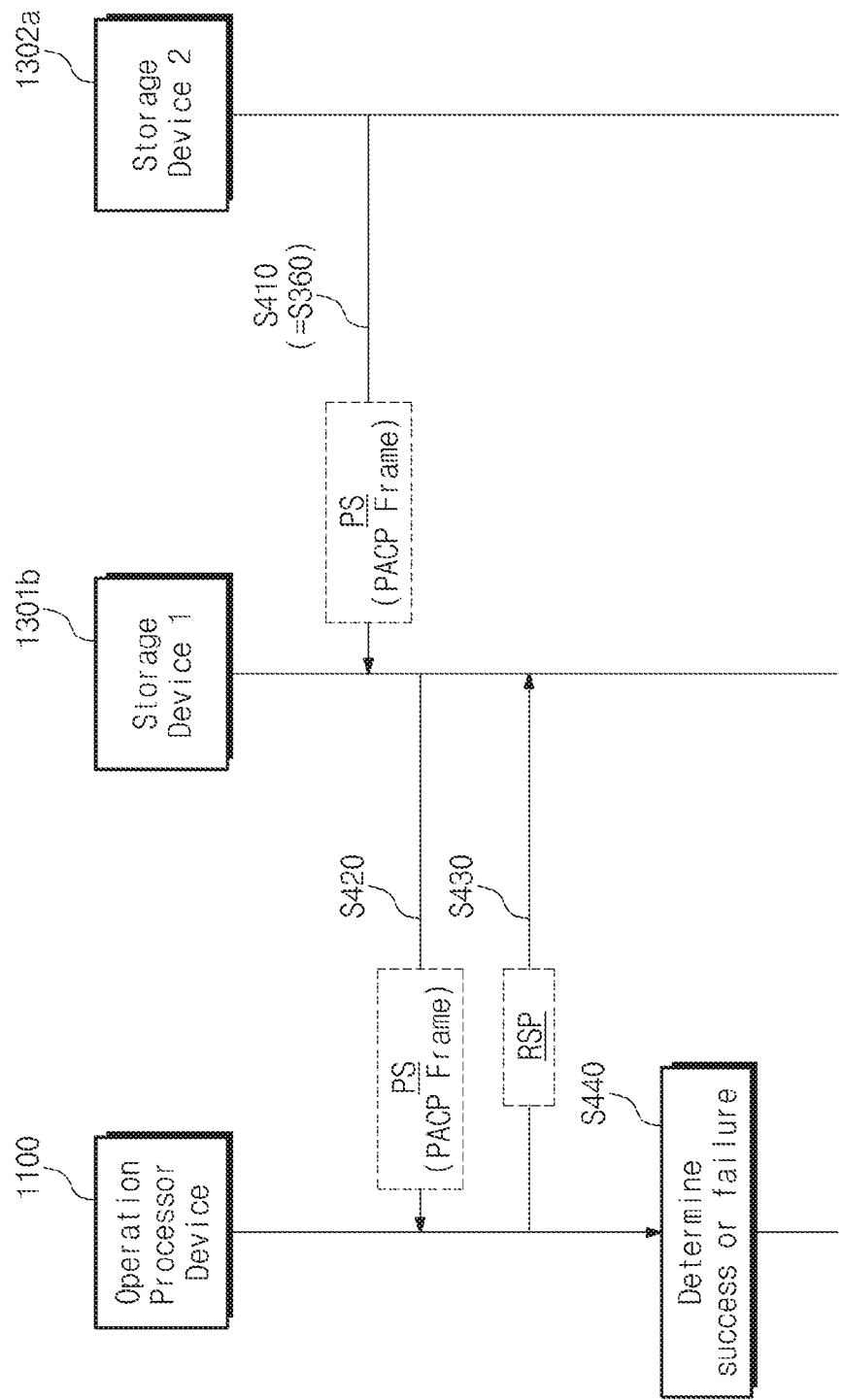
FIG. 20 is a flowchart describing communication that is performed in the storage system of FIG. 15 according to the response process of FIG. 19.

FIG. 20 is a flowchart describing an example communication that may be performed in storage system 1000 of FIG. 15 according to the response process of FIG. 19. Storage devices 1301b and 1302a may process the communication of FIG. 20 according to operations of internal interface adaptors which may comprise controllers 1331 and 1332 respectively, shown in FIG. 1.

In operation S410, second storage device 1302a may output the response PS corresponding to the request QS to first storage device 1301b. Accordingly, first storage device 1301b may receive the response PS from second storage device 1302a, in response to success or failure in changing a communication condition of second storage device 1302a. In operation S420, first storage device 1301b may transfer the response PS to operation processor device 1100.

In operation S430, operation processor device 1100 may transmit the response RSP corresponding to the response PS to first storage device 1301b. The response RSP may indicate that the response PS has been well received. In operation S440, operation processor device 1100 may determine the success or failure in changing the communication condition of second storage device 1302a, based on the response PS.

Figure 21:
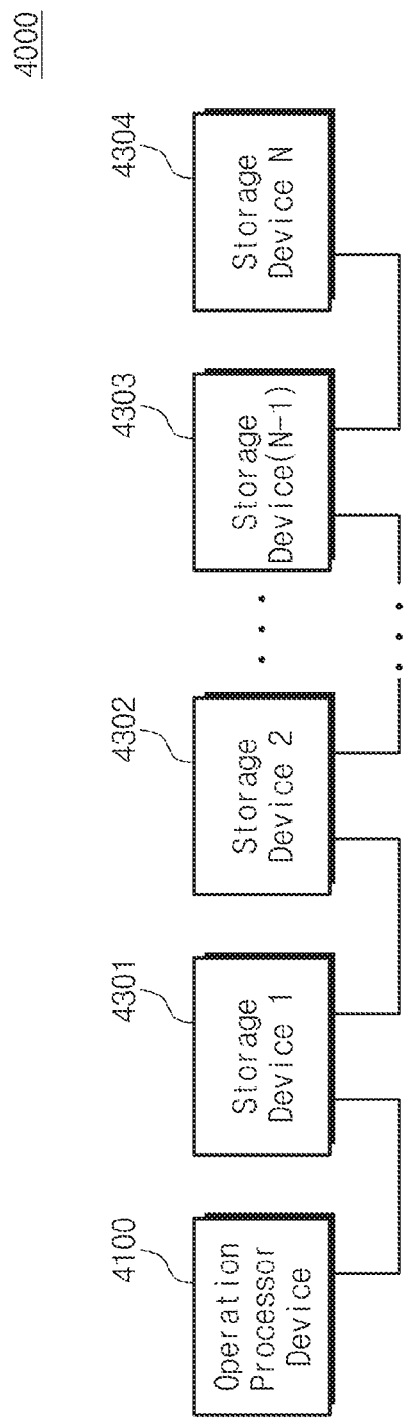
FIG. 21 is a block diagram illustrating a storage system that includes serially connected storage devices, according to some example embodiments.

FIG. 21 is a block diagram illustrating a storage system 4000 that includes serially connected storage devices, according to some example embodiments. FIGS. 22A and 22B are conceptual diagrams for describing a process of an operation processor device 4100 in storage system 4000 of FIG. 21 controlling a storage device that is not directly connected to operation processor device 4100.

In regards to FIGS. 1 to 20, electronic system 1000 has been described to include two storage devices (e.g., storage devices 1301a and 1302a). However, referring to FIG. 21, the storage system 4000 according to some example embodiments may include a plurality of storage devices 4301 to 4304 that are serially connected to operation processor device 4100.

Operation processor device 4100 may correspond to operation processor device 1100 described with reference to FIGS. 1 to 20. Each of storage devices 4301 to 4304 may correspond to first storage device 1301a, 1301b, 1301b1, or 1301b2, or second storage device 1302a, 1302a1, or 1302a2 described with reference to FIGS. 1 to 20.

Storage devices 4301 to 4304 may be serially connected through input/output ports thereof. A first storage device 4301 may be placed at a tail end of the serial connection. A second storage device 4302 may be connected to directly communicate with first storage device 4301. In this manner, storage devices 4301 to 4304 may be connected in the topology of a chain structure or a daisy-chain structure.

Operation processor device 4100 may be connected to directly communicate with first storage device 4301. On the other hand, operation processor device 4100 may not be directly connected with remaining storage devices 4302 to 4304 other than first storage device 4301. When operation processor device 4100 intends to control first storage device 4301, operation processor device 4100 may communicate with first storage device 4301 based on the process described with reference to FIG. 4.

Meanwhile, in some cases, operation processor device 4100 may intend to control at least one of the remaining storage devices 4302 to 4304. In this case, storage system 4000 may employ at least one of configurations, operations, processes, methods, and communications described with reference to FIGS. 6 to 20.

For example, referring to FIG. 22A, operation processor device 4100 may intend to control second storage device 4302. In some example embodiments, first storage device 4301 may receive a request of the first format from operation processor device 4100. When control information included in the request of the first format is configured for second storage device 4302, first storage device 4301 may convert the request of the first format into a request of the second format, and may output the request of the second format to second storage device 4302. A communication condition of second storage device 4302 may be set or changed based on the request of the second format.

In some example embodiments, first storage device 4301 may receive a request including a port identifier from operation processor device 4100. When the port identifier corresponds to second storage device 4302, first storage device 4301 may transfer the received request to second storage device 4302. The communication condition of second storage device 4302 may be set or changed based on the transferred request.

For example, referring to FIG. 22B, operation processor device 4100 may intend to control $N^{th}$ storage device 4304. In some example embodiments, first storage device 4301 may receive a request of the first format from the operation processor device 4100. When control information included in the request of the first format is not configured for first storage device 4301 and second storage device 4302, first storage device 4301 may transfer the request of the first format to second storage device 4302 without conversion.

In such a manner, the request of the first format may be transferred to $(N-1)^{th}$ storage device 4303. When the control information included in the request of the first format is configured for $N^{th}$ storage device 4304, $(N-1)^{th}$ storage device 4303 may convert the request of the first format into a request of the second format, and may output the request of the second format to $N^{th}$ storage device 4304. A communication condition of $N^{th}$ storage device 4304 may be set or changed based on the request of the second format.

In some example embodiments, first storage device 4301 may receive a request including a port identifier from operation processor device 4100. When the port identifier does not correspond to first storage device 4301, first storage device 4301 may transfer the received request to second storage device 4302. When the port identifier does not correspond to second storage device 4302, second storage device 4302 may transfer the transferred request to another storage device.

In such a manner, the request may be transferred to a storage device that corresponds to a port identifier included in the request. For example, when the port identifier corresponds to $N^{th}$ storage device 4304, the request may be transferred to $N^{th}$ storage device 4304 through $(N-1)^{th}$ storage device 4303. The communication condition of $N^{th}$ storage device 4304 may be set or changed based on the transferred request.

Figure 23A:
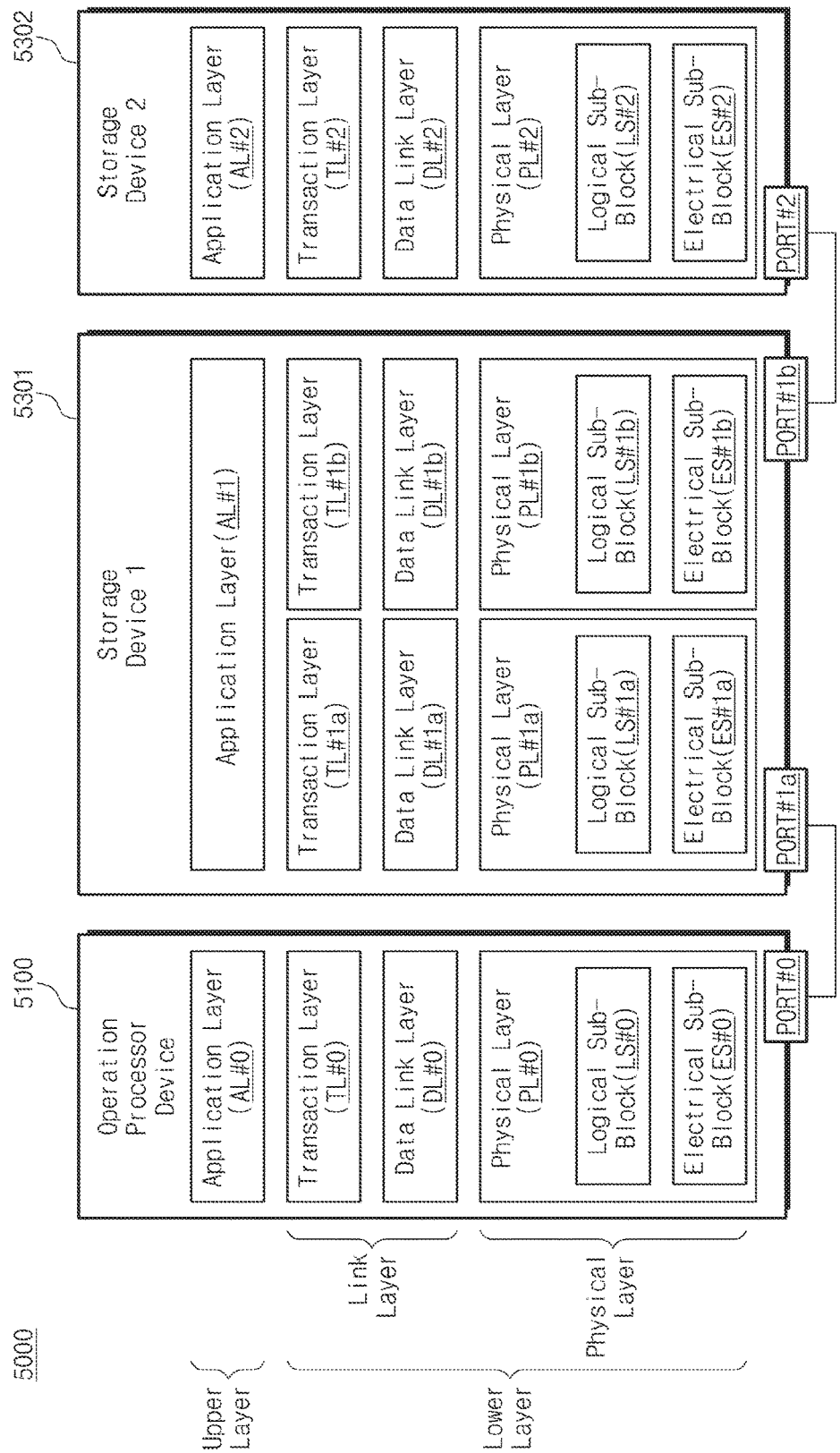
FIGS. 23A and 23B are block diagrams illustrating hierarchical structures in compliance with example interface protocols that may be employed in a storage system according to some example embodiments.
Figure 23B:
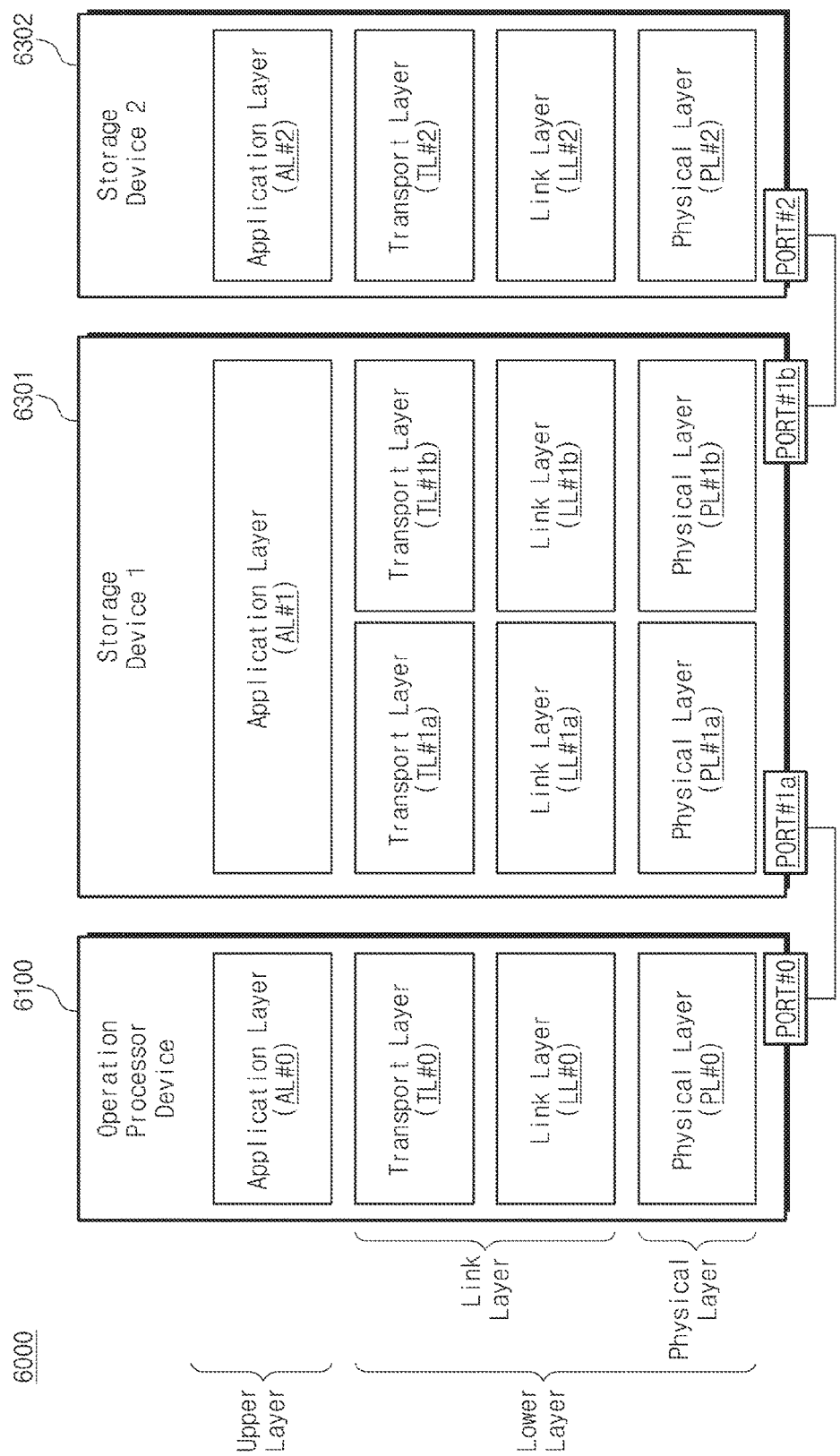

FIGS. 23A and 23B are block diagrams illustrating hierarchical structures in compliance with example interface protocols that may be employed in a storage system according to some example embodiments.

Referring to FIG. 23A, a storage system 5000 may include an operation processor device 5100 and storage devices 5301 and 5302. First storage device 5301 may be connected to directly communicate with operation processor device 5100 through the input/output ports PORT#1a and PORT#0. First storage device 5301 may be connected to directly communicate with second storage device 5302 through the input/output ports PORT#1b and PORT#2. Meanwhile, second storage device 5302 may not be directly connected with operation processor device 5100. First storage device 5301 may include at least one interface adaptor for supporting communication by first storage device 5301 through first and second input/output ports PORT1A and PORT1B via a protocol having a plurality of layers. The interface adaptor may be implemented at least in part by an internal controller such as controller 1331 shown in FIG. 1. The interface adaptor may be implemented at least in part by a hardware circuit and/or a program code that is executable by a processor core. In the description to follow, when it is said that a certain layer performs an action, that action may be performed by the interface adaptor which implements the protocol having the layers. Although not shown in FIG. 23A, first storage device 5301 may also include one or more nonvolatile memories such as the one or more nonvolatile memory 1311 of FIG. 1, and second storage device 5302 may include one or more nonvolatile memories such as the one or more nonvolatile memory 1312 of FIG. 1.

For example, operation processor device 5100 and storage devices 5301 and 5302 may be implemented in compliance with a PCIe protocol or a NVMe protocol, to communicate with each other. Physical layers PL#0, PL#1a, PL#1b, and PL#2, which constitute a physical layer, may handle transmitting/receiving signals/packets. The physical layers PL#0, PL#1a, PL#1b, and PL#2 may physically/logically process signals/packets to be transmitted/received, according to functions of logical sub-blocks LS#0, LS#1a, LS#1b, and LS#2 and electrical sub-blocks ES#0, ES#1a, ES#1b, and ES#2.

Data link layers DL#0, DL#1a, DL#1b, and DL#2 and transaction layers TL#0, TL#1a, TL#1b, and TL#2, which constitute a link layer, may handle transferring and converting signals/packets transmitted/received through the physical layer. Application layers AL#0, AL#1, and AL#2, which constitute an upper layer, may provide communication services. The physical layer and link layer, which constitute a lower layer, may take charge of a signal/packet transfer to the upper layer.

According to some example embodiments, operation processor device 5100 may directly control a communication condition of second storage device 1302a that is not directly connected to operation processor device 5100. For example, first storage device 5301 may receive a first request having a data format that is processed in the upper layer, from operation processor device 5100. First storage device 5301 may convert the first request to generate a second request having a data format that is processed in the lower layer. Second storage device 5302 may set or change a communication condition of the physical layer, based on the second request provided from first storage device 5301.

In some other example embodiments, first storage device 5301 may receive a request including a port identifier from operation processor device 5100. First storage device 5301 may transfer the received request to second storage device 5302 based on the port identifier. Second storage device 5302 may set or change a communication condition of the physical layer, based on the transferred request.

Referring to FIG. 23B, a storage system 6000 may include an operation processor device 6100 and storage devices 6301 and 6302. First storage device 6301 may be connected to directly communicate with operation processor device 6100 through the input/output ports PORT#1a and PORT#0. First storage device 6301 may be connected to directly communicate with second storage device 6302 through the input/output ports PORT#1b and PORT#2. Meanwhile, second storage device 6302 may not be directly connected with operation processor device 6100. First storage device 6301 may include at least one interface adaptor for supporting communication by first storage device 6301 through first and second input/output ports PORT1A and PORT1B via a protocol having a plurality of layers. The interface adaptor may be implemented at least in part by an internal controller such as controller 1331 shown in FIG. 1. The interface adaptor may be implemented at least in part by a hardware circuit and/or a program code that is executable by a processor core. In the description to follow, when it is said that a certain layer performs an action, that action may be performed by the interface adaptor which implements the protocol having the layers. Although not shown in FIG. 23B, first storage device 6301 may also include one or more nonvolatile memories such as the one or more nonvolatile memory 1311 of FIG. 1, and second storage device 6302 may include one or more nonvolatile memories such as the one or more nonvolatile memory 1312 of FIG. 1

For example, operation processor device 6100 and storage devices 6301 and 6302 may be implemented in compliance with a SATA protocol or a SAS protocol, to communicate with each other. The physical layers PL#0, PL#1a, PL#1b, and PL#2, which constitute a physical layer, may handle transmitting/receiving signals/packets. Link layers LL#0, LL#1a, LL#1b, and LL#2 and transport layers TL#0, TL#1a, TL#1b, and TL#2, which constitute a link layer, may handle transferring and converting signals/packets transmitted/received through the physical layer. The application layers AL#0, AL#1, and AL#2, which constitute an upper layer, may provide communication services. The physical layer and link layer, which constitute a lower layer, may take charge of a signal/packet transfer to the upper layer.

According to some example embodiments, operation processor device 6100 may directly control a communication condition of second storage device 6302 that is not directly connected to operation processor device 6100. For example, first storage device 6301 may receive a first request having a data format that is processed in the upper layer, from operation processor device 6100. First storage device 6301 may convert the first request to generate a second request having a data format that is processed in the lower layer. Second storage device 6302 may set or change a communication condition of the physical layer, based on the second request provided from first storage device 6301.

In some other example embodiments, first storage device 6301 may receive a request including a port identifier from operation processor device 6100. First storage device 6301 may transfer the received request to second storage device 6302 based on the port identifier. Second storage device 6302 may set or change a communication condition of the physical layer, based on the transferred request.

Figure 24:
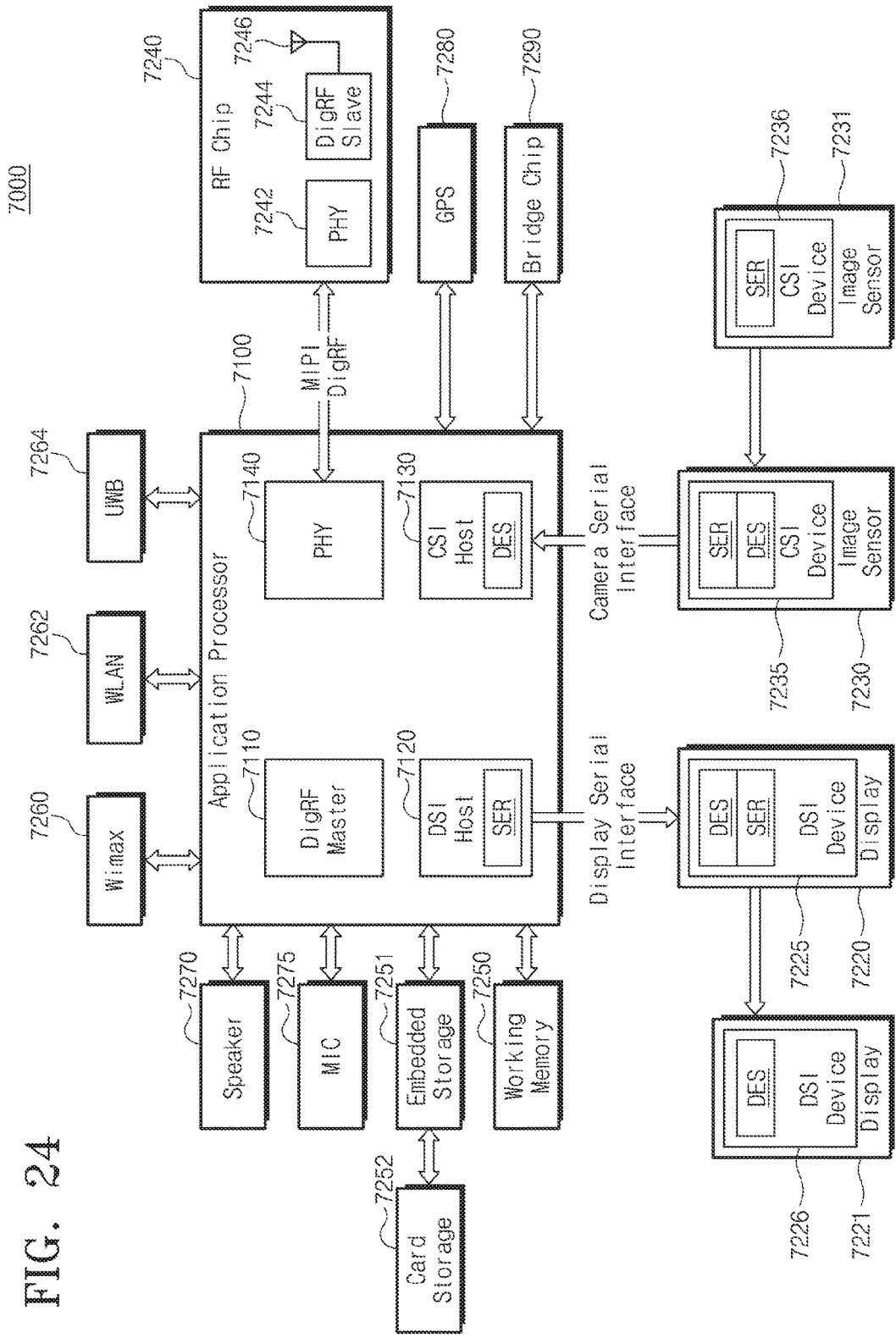
FIG. 24 is a block diagram illustrating a configuration of an electronic device and interfaces thereof, according to some example embodiments.

FIG. 24 is a block diagram illustrating a configuration of an electronic device and interfaces thereof, according to some example embodiments. An electronic system 7000 may be implemented with a data processing device capable of using or supporting an interface protocol supported by the MIPI alliance. For example, electronic device 7000 may be one of electronic devices such as a portable communication terminal, a personal digital assistant (PDA), a portable multimedia player (PMP), a smart phone, a tablet computer, a wearable device, and/or the like.

Electronic device 7000 may include an application processor 7100, displays 7220 and 7221, and image sensors 7230 and 7231. Application processor 7100 may include a DigRF master 7110, a display serial interface (DSI) host 7120, a camera serial interface (CSI) host 7130, and a physical layer 7140.

DSI host 7120 may communicate with a DSI device 7225 of display 7220 in compliance with the DSI. For example, an optical serializer SER may be implemented in DSI host 7120, and an optical deserializer DES may be implemented in DSI device 7225. Display 7220 may communicate with a DSI device 7226 of display 7221 in compliance with the DSI. For example, an optical serializer SER may be further implemented in DSI host 7225, and an optical deserializer DES may be implemented in DSI device 7226. Meanwhile, display 7221 may not be directly connected with application processor 7100.

According to the example embodiments, application processor 7100 may directly control DSI device 7226 of display 7221. For example, display 7220 may convert a format of a request received from application processor 7100, and then may provide the converted request to display 7221. For another example, display 7220 may transfer a request including a port identifier to display 7221. Display 7221 may set or change a communication condition based on the transferred request.

CSI host 7130 may communicate with a CSI device 7235 of image sensor 7230 in compliance with the CSI. For example, an optical deserializer DES may be implemented in CSI host 7130, and an optical serializer SER may be implemented in CSI device 7235. Image sensor 7230 may communicate with a CSI device 7236 of image sensor 7231 in compliance with the CSI. For example, an optical deserializer DES may be further implemented in CSI host 7235, and an optical serializer SER may be implemented in CSI device 7236. Meanwhile, image sensor 7231 may not be directly connected with application processor 7100.

According to some example embodiments, application processor 7100 may directly control CSI device 7236 of display 7231. For example, image sensor 7230 may convert a format of a request received from application processor 7100, and then may provide the converted request to image sensor 7231. For another example, image sensor 7230 may transfer a request including a port identifier to image sensor 7231. Image sensor 7231 may set or change a communication condition based on the transferred request.

Electronic device 7000 may further include a radio frequency (RF) chip 7240 that communicates with application processor 7100. RF chip 7240 may include a physical layer 7242, a DigRF slave 7244, and an antenna 7246. For example, physical layer 7242 of RF chip 7240 and a physical layer 7140 of application processor 7100 may exchange data with each other in compliance with a DigRF interface supported by the MIPI alliance.

Electronic device 7000 may further include a working memory 7250, an embedded storage device 7251, and a card storage device 7252. Working memory 7250, embedded storage device 7251, and card storage device 7252 may store data provided from application processor 7100. In addition, working memory 7250, embedded storage device 7251, and card storage device 7252 may provide the stored data to application processor 7100.

Working memory 7250 may temporarily store data processed or to be processed by application processor 7100. Working memory 7250 may include a volatile memory, such as a SRAM, a dynamic RAM (DRAM), and/or a synchronous DRAM (SDRAM), and/or a nonvolatile memory, such as a flash memory, a PRAM, a MRAM, a ReRAM, and/or a FRAM.

Embedded storage device 7251 and card storage device 7252 may store data regardless of power supply. For example, embedded storage device 7251 and card storage device 7252 may correspond to embedded storage device 2301 and removable storage device 2302 of FIG. 2 respectively. Embedded storage device 7251 may be connected to directly communicate with each of card storage device 7252 and application processor 7100. Card storage device 7252 may not be directly connected with application processor 7100. However, application processor 7100 may directly control a communication condition of card storage device 7252 according to some example embodiments.

Electronic device 7000 may communicate with an external device/system through a communication module, such as a worldwide interoperability for microwave access (WiMAX) 7260, a wireless local area network (WLAN) 7262, an ultra-wideband (UWB) 7264, and/or the like. Besides, electronic device 7000 may communicate with the external device/system based on at least one of various wireless communication protocols, such as long term evolution (LTE), global system for mobile communication (GSM), code division multiple access (CDMA), Bluetooth, near field communication (NFC), wireless fidelity (Wi-Fi), and/or radio frequency identification (RFID), and/or various wired communication protocols, such as transfer control protocol/Internet protocol (TCP/IP), USB, SCSI, mobile PCIe (M-PCIe), and/or Firewire.

Electronic device 7000 may further include a speaker 7270 and a microphone 7275 for processing voice information. In addition, electronic device 7000 may further include a global positioning system (GPS) device 7280 for processing position/geographic information. Electronic device 7000 may further include a bridge chip 7290 for managing connections with peripheral devices.

Electronic device 7000 may communicate with a user by employing various user interfaces. For example, the user interface may include input interfaces such as a keyboard, a mouse, a keypad, a button, a touch panel, a touch screen, a touch pad, a touch ball, a camera, a gyroscope sensor, a vibration sensor, a rotary knob, and/or the like. For example, the user interface may include output interfaces such as a liquid crystal display (LCD) device, a light emitting diode (LED) display device, an organic LED (OLED) display device, an active matrix OLED (AMOLED) display device, a speaker, a motor, and/or the like.

According to the example embodiments of the present disclosure, an operation processor device may directly control an electronic device that is not directly connected to the operation processor device from among serially connected electronic devices. According to the example embodiments of the present disclosure, it may be possible to reduce design/manufacturing costs of the operation processor device and configuration complexity thereof. Accordingly, the example embodiments may satisfy user requirements while bringing economical benefits.

Although detailed embodiments have been described, it should be understood that numerous other modifications, changes, variations, and substitutions can be devised by those skilled in the art. Moreover, it should be understood that the present disclosure covers various techniques which can be readily modified and embodied based on the above-described example embodiments.

What is claimed is:

1. A device, comprising:
   a first input/output port configured to be connected to an external processor for communication between the external processor and the device;
   a second input/output port configured to be connected to a second device for communication between the external processor and the second device via the device; and
   at least one interface adaptor for supporting communication by the device through the first and second input/output ports via a protocol having a plurality of layers including at least an application layer, a physical layer, and a physical adaptor layer, wherein the application layer processes information according to an application layer format and the physical adaptor layer processes information according to a physical adaptor layer format,
   wherein the device is configured to receive from the external processor through the first input/output port a request in the application layer format that one or more communication conditions be set for a physical layer of the second device, wherein the received request includes a command and condition value information for setting the one or more communication conditions for the physical layer of the second device, to convert the received request from the application layer format to the physical adaptor layer format, and to send the converted request in the physical adaptor layer format to the second device through the second input/output port.

2. The device of claim 1, further comprising nonvolatile memory configured to store data for access by the external processor through the first input/output port.

3. The device of claim 1, further comprising:
   conversion logic which is configured to extract control information from the received request, wherein the control information identifies the one or more communication conditions to be set for the physical layer of the second device; and
memory associated with the conversion logic for storing the first control information.

4. The device of claim 3, wherein the conversion logic further comprises:
a target determination circuit which is configured to determine from the received request that a target of the received request is the second device; and
a format reconfiguration block which reconfigures the control information for the converted request in the physical adaptor layer format.

5. The device of claim 4, wherein the application layer format comprises a universal flash storage (UFS) protocol information unit packet format, and the physical adaptor layer format comprises a physical adaptor layer (PACP) frame format.

6. The device of claim 1, wherein the device is further configured to receive from the second device through the second input/output port a response to the converted request, the response being received by the device in the physical adaptor layer format, to convert the received response from the physical adaptor layer format to the application layer format, and to send the converted response in the application layer format to the external processor through the first input/output port.

7. The device of claim 1, wherein the device is further configured to receive from the external processor through the first input/output port a second request in the application layer format that one or more communication conditions be set for a physical layer of a third device connected serially to the second device, and to send the request in the application layer format to the second device through the second input/output port.

8. The device of claim 7, wherein the device is further configured to receive from the external processor through the first input/output port a third request in the physical adaptor layer format that one or more communication conditions be set for the physical layer of the first input/output port of the device, and in response to the received third request to set the one or more communication conditions for the physical layer of the first input/output port of the device.

9. The device of claim 1, wherein the physical adaptor layer format includes a port IF field and the received request includes a port ID in the port ID field, the port ID identifying a target port for the received request, and wherein the device includes target determination logic which is configured to determine from the port ID that the received request pertains to the second device.

10. A storage system, including:
a processor having a processor input/output port; and
a first storage device having a first input/output port connected to the processor input/output port for communication between the processor and the first storage device, and having a second input/output port, the first storage device further comprising a first nonvolatile memory for storing data associated with the processor, and at least one first interface adaptor for supporting communication by the first storage device through the first and second input/output ports via a protocol having a plurality of layers including at least a physical layer for each of the input/output ports,
wherein the processor is configured to detect when a second storage device is connected to the second input/output port of the first storage device, and in response thereto to send to the first storage device through the first input/output port a request that a communication condition be set for a physical layer of the second storage device, wherein the sent request includes a command and condition value information for setting the one or more communication conditions for the physical layer of the second device,
wherein the first storage device is configured such that in response to receiving the request the first storage device provides the request to the second storage device through the second input/output port in a format which can be processed by a layer of the second storage device which manages communication conditions of the physical layer of the second storage device, and
wherein the plurality of layers further includes at least an application layer and a physical adaptor layer, wherein the application layer processes information according to an application layer format and the physical adaptor layer processes information according to a physical adaptor layer format, and wherein the first storage device receives the request in the application layer format and is configured to convert the received request from the application layer format to the physical adaptor layer format, and to send the converted request in the physical adaptor layer format to the second storage device through the second input/output port.

11. The storage system of claim 10, wherein the first storage device further comprises:
conversion logic which is configured to extract control information from the received request, wherein the control information identifies the one or more communication conditions to be set for the physical layer of the second storage device; and
memory associated with the conversion logic for storing the first control information.

12. The device of claim 1, wherein the one or more communication conditions include a communication speed of the physical layer of the second device.

13. The device of claim 1, wherein the one or more communication conditions include an entry or exit of a hibernation state for the physical layer of the second device.

14. The device of claim 1, wherein the one or more communication conditions include a power mode of the physical layer of the second device.

15. The device of claim 10, wherein the communication condition is a communication speed of the physical layer of the second device.

16. The device of claim 10, wherein the communication condition is an entry or exit of a hibernation state for the physical layer of the second device.

* * * * *